(12) United States Patent
Kim et al.

(10) Patent No.: US 10,735,390 B2
(45) Date of Patent: Aug. 4, 2020

(54) METHOD FOR AUTHENTICATION AND ELECTRONIC DEVICE SUPPORTING THE SAME

(71) Applicant: Samsung Electronics Co., Ltd, Gyeonggi-do (KR)

(72) Inventors: Jaehwan Kim, Gyeonggi-do (KR); Junghun Kim, Gyeonggi-do (KR); Jinwoo Lee, Seoul (KR); Yongjoon Jeon, Gyeonggi-do (KR); Bokun Choi, Seoul (KR); Jongmu Choi, Gyeonggi-do (KR); Dongeup Ham, Gyeonggi-do (KR); Dongwoo Kim, Daegu (KR); Sangmi Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 15/519,508

(22) PCT Filed: Oct. 15, 2015

(86) PCT No.: PCT/KR2015/010884
§ 371 (c)(1),
(2) Date: Apr. 14, 2017

(87) PCT Pub. No.: WO2016/060489
PCT Pub. Date: Apr. 21, 2016

(65) Prior Publication Data
US 2017/0244688 A1    Aug. 24, 2017

(30) Foreign Application Priority Data

Oct. 15, 2014  (KR) .......................... 10-2014-0139206
Oct. 6, 2015   (KR) .......................... 10-2015-0140632

(51) Int. Cl.
H04L 29/06   (2006.01)
G06F 21/31   (2013.01)
G06F 21/62   (2013.01)

(52) U.S. Cl.
CPC ............ H04L 63/062 (2013.01); G06F 21/31 (2013.01); G06F 21/6218 (2013.01);
(Continued)

(58) Field of Classification Search
CPC ....... G06F 21/31; H04L 63/062; H04L 63/08; H04L 63/0861
See application file for complete search history.

(56) References Cited

U.S. PATENT DOCUMENTS 8,578,457 B2   11/2013  Kan
8,646,060 B1   2/2014   Ayed
(Continued)

FOREIGN PATENT DOCUMENTS

WO    2014/151556 A1    9/2014

OTHER PUBLICATIONS

International Search Report dated Feb. 11, 2016 in connection with International Application No. PCT/KR2015/010884, 3 pages.
(Continued)

*Primary Examiner* — Dao Q Ho

(57) ABSTRACT

In an authentication method according to an embodiment, an electronic device receives an authentication request message based on identification information from a server apparatus. In response to the authentication request message, the electronic device receives at least one of an input for authentication approval of a specific device and an input for authentication approval of a service offered through the specific device. Then, in response to the input, the electronic device transmits authentication approval information to the server apparatus.

6 Claims, 24 Drawing Sheets

(52) U.S. Cl.
CPC .......... *H04L 63/08* (2013.01); *H04L 63/0861* (2013.01); *H04L 63/107* (2013.01); *G06F 2221/2115* (2013.01)

(56) References Cited

U.S. PATENT DOCUMENTS

| | | |
|---|---|---|
| 2011/0103586 A1 | 5/2011 | Nobre |
| 2011/0215921 A1 | 9/2011 | Ayed et al. |
| 2014/0189808 A1 | 7/2014 | Mahaffey et al. |
| 2014/0223516 A1 | 8/2014 | Vongsouvanh et al. |
| 2014/0282961 A1 | 9/2014 | Dorfman et al. |

OTHER PUBLICATIONS

Written Opinion of the International Searching Authority dated Feb. 11, 2016 in connection with International Application No. PCT/KR2015/010884, 11 pages.

[Fig. 1]
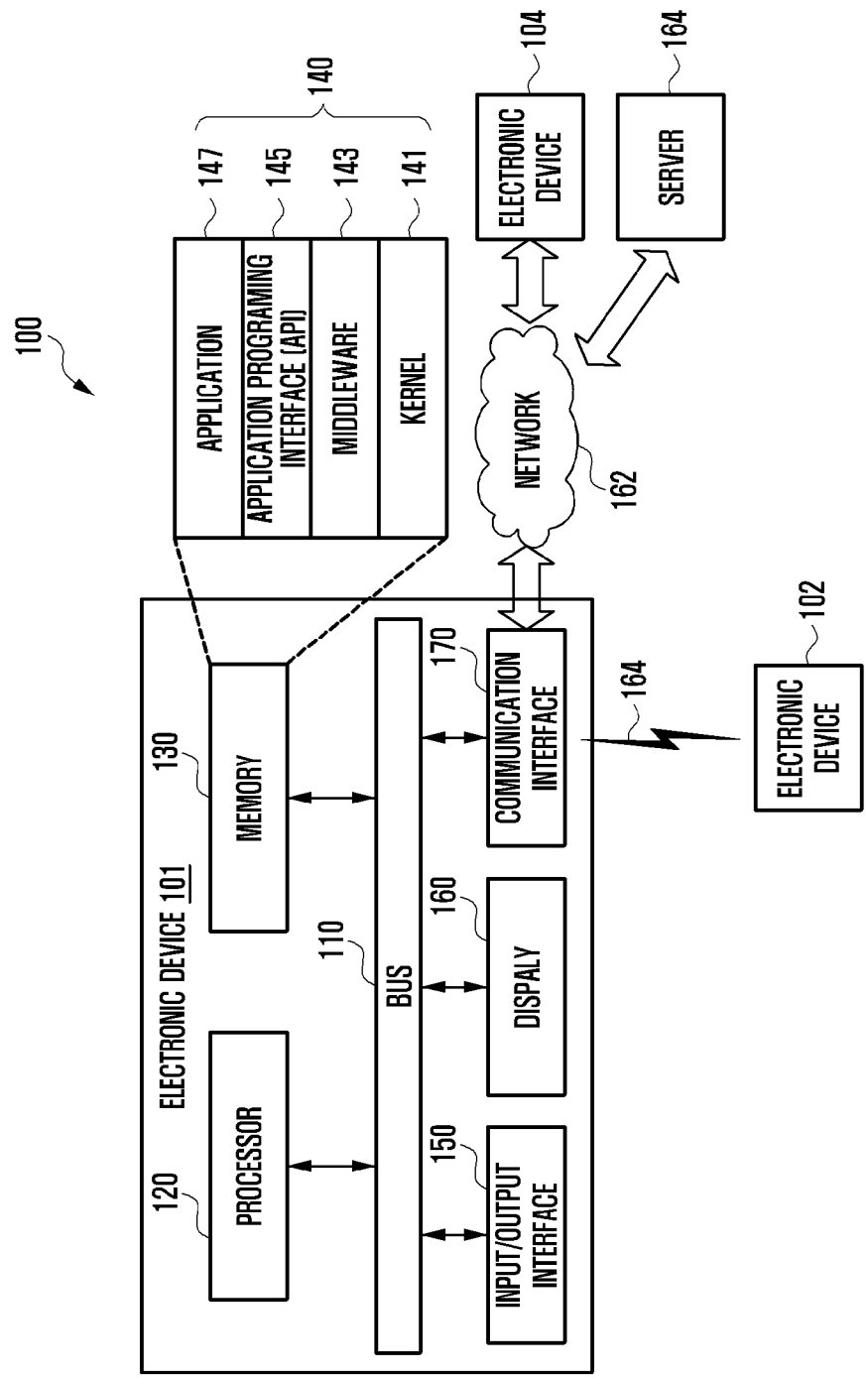

[Fig. 2]
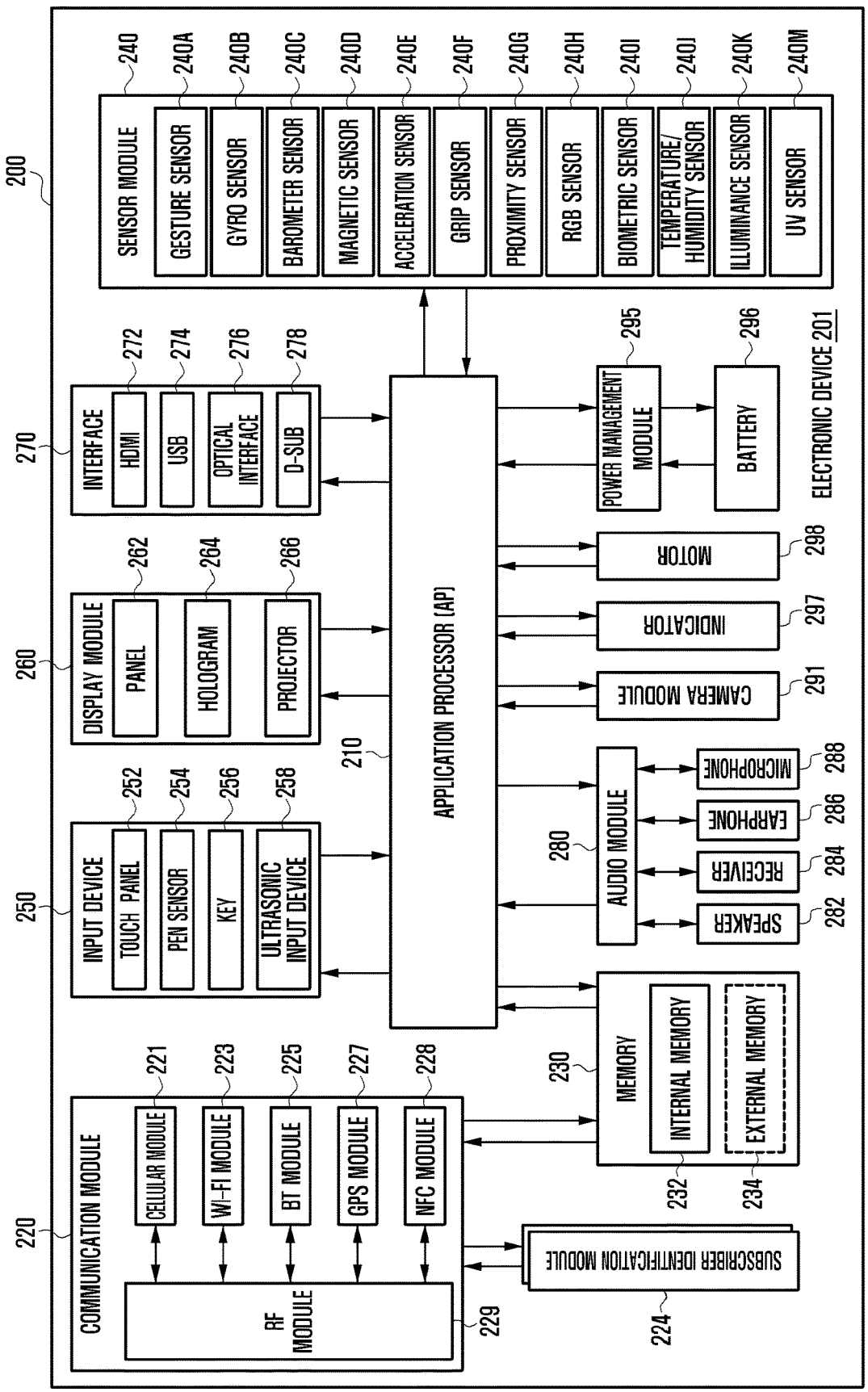

[Fig. 3]
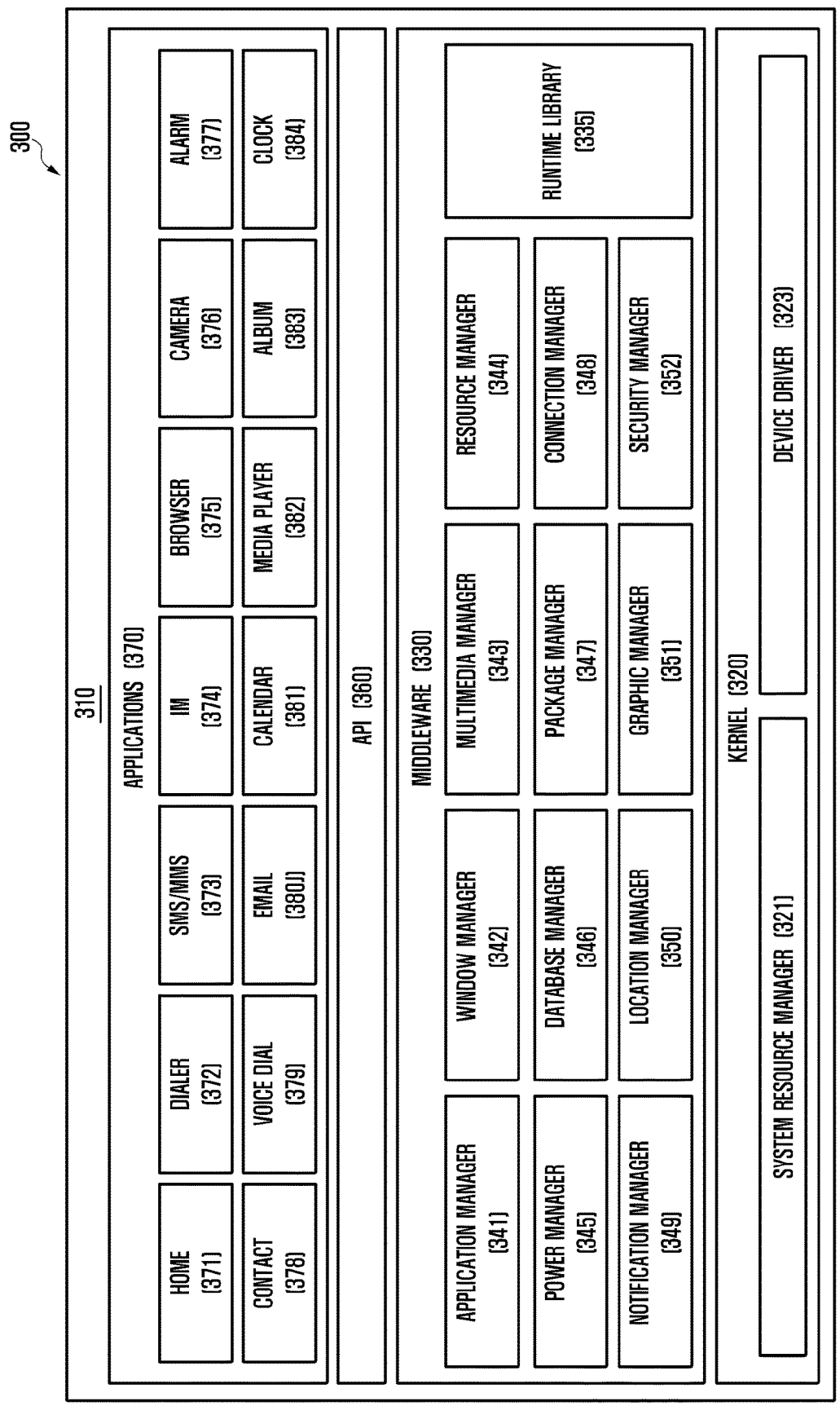

[Fig. 4A]
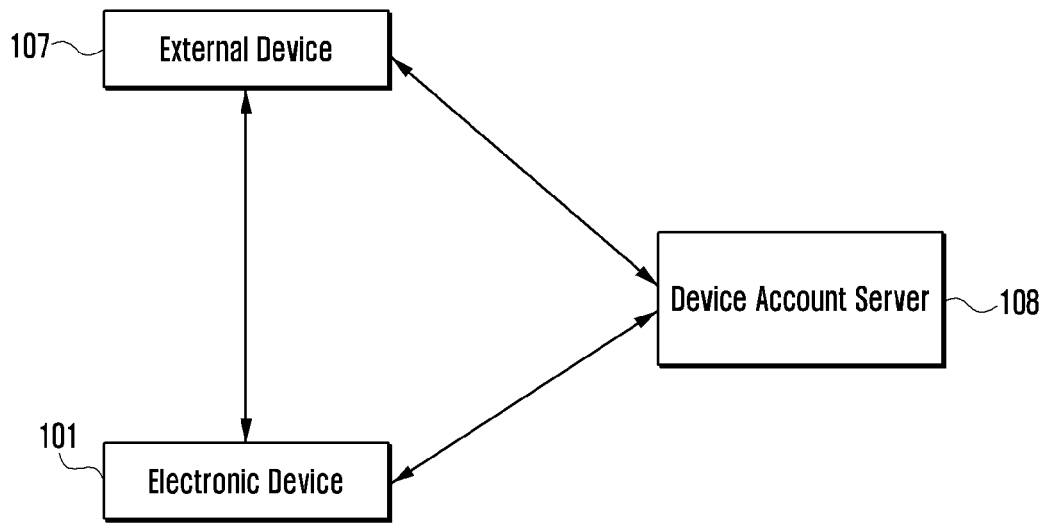
[Fig. 4B]
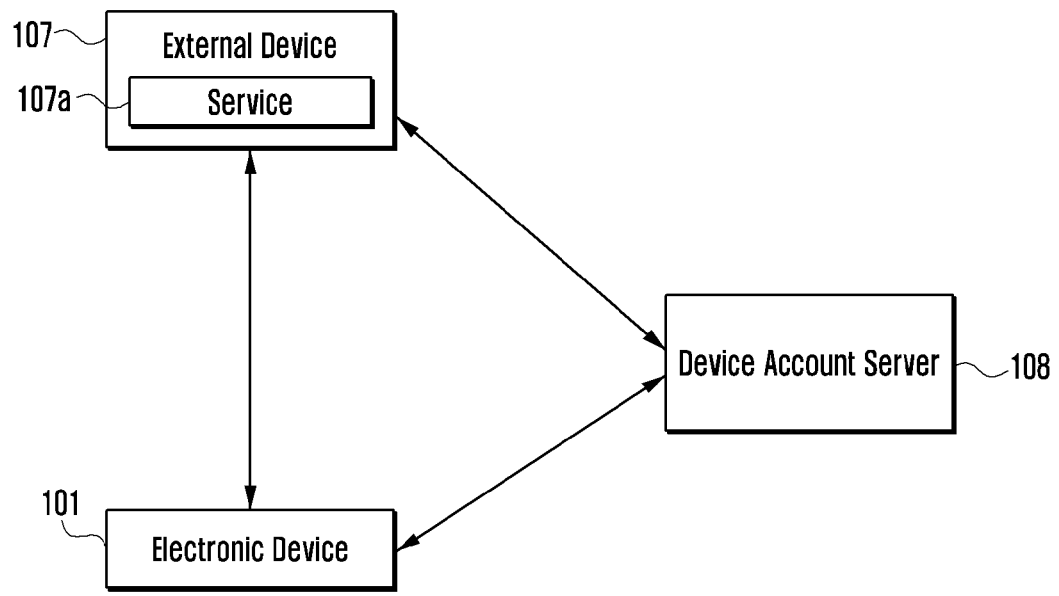
[Fig. 4C]
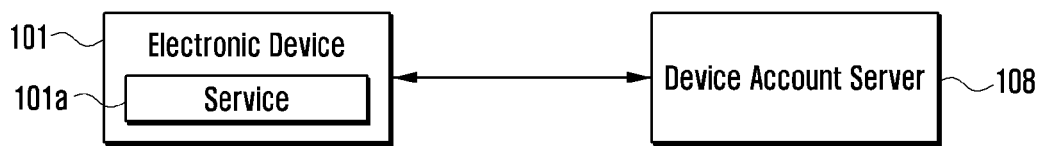

[Fig. 5A]
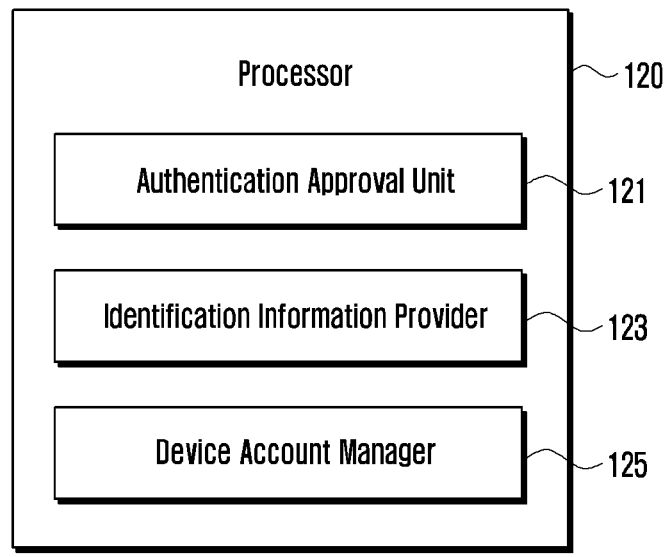
[Fig. 5B]
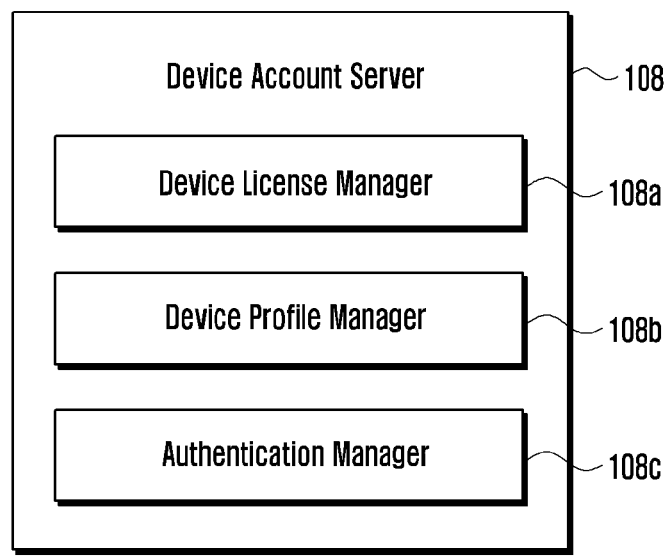

[Fig. 6A]
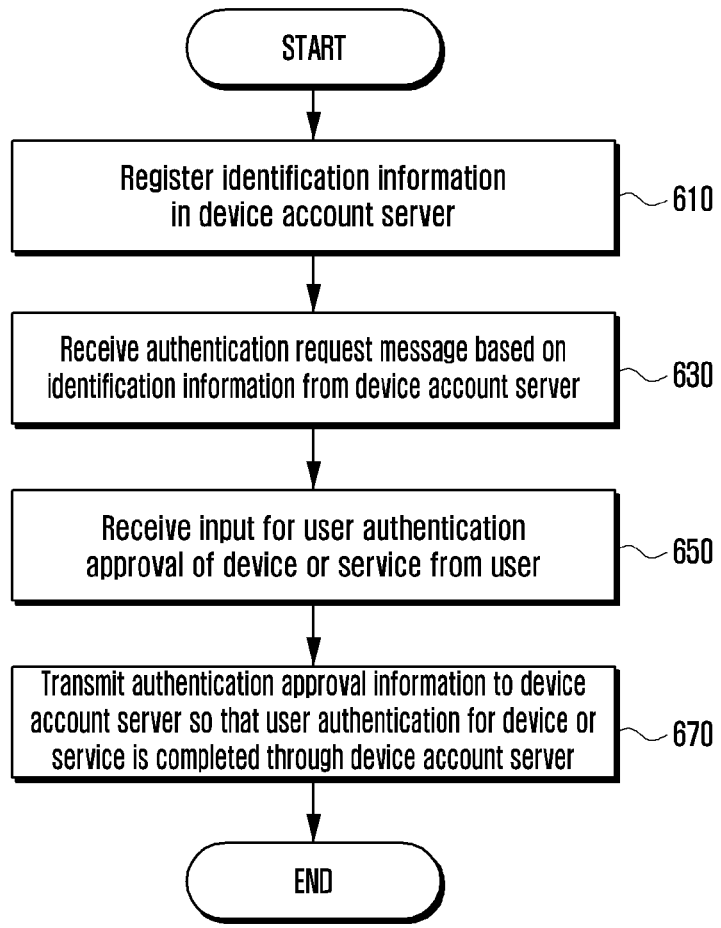
[Fig. 6B]
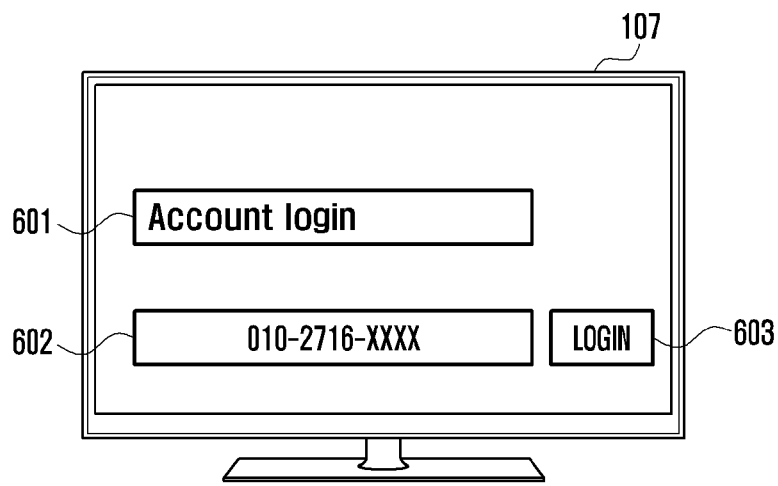

[Fig. 6C]
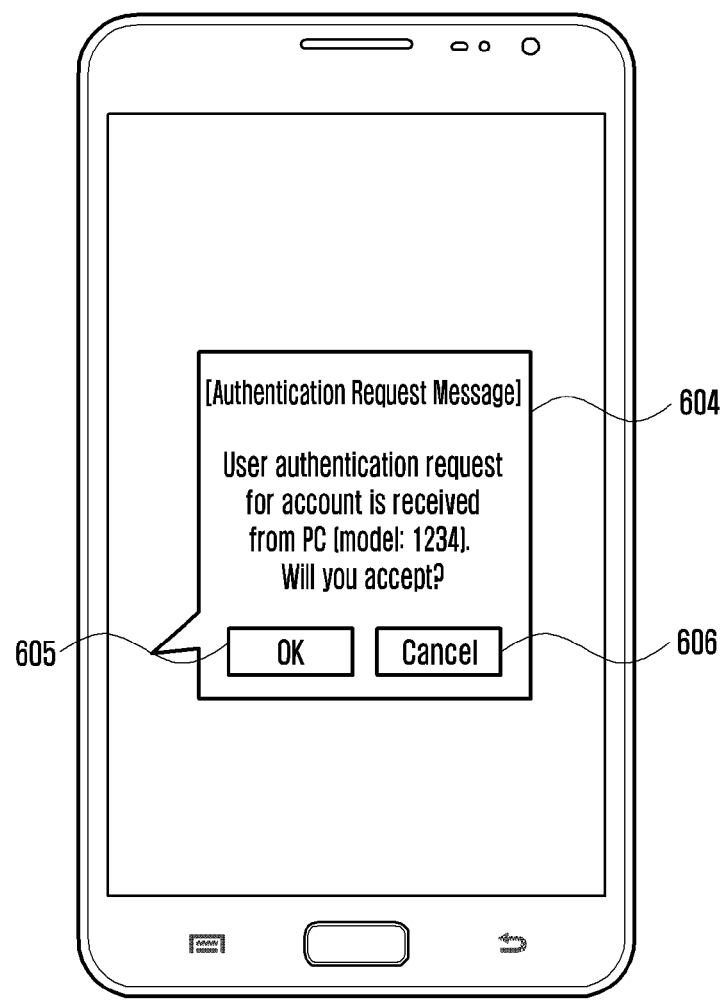

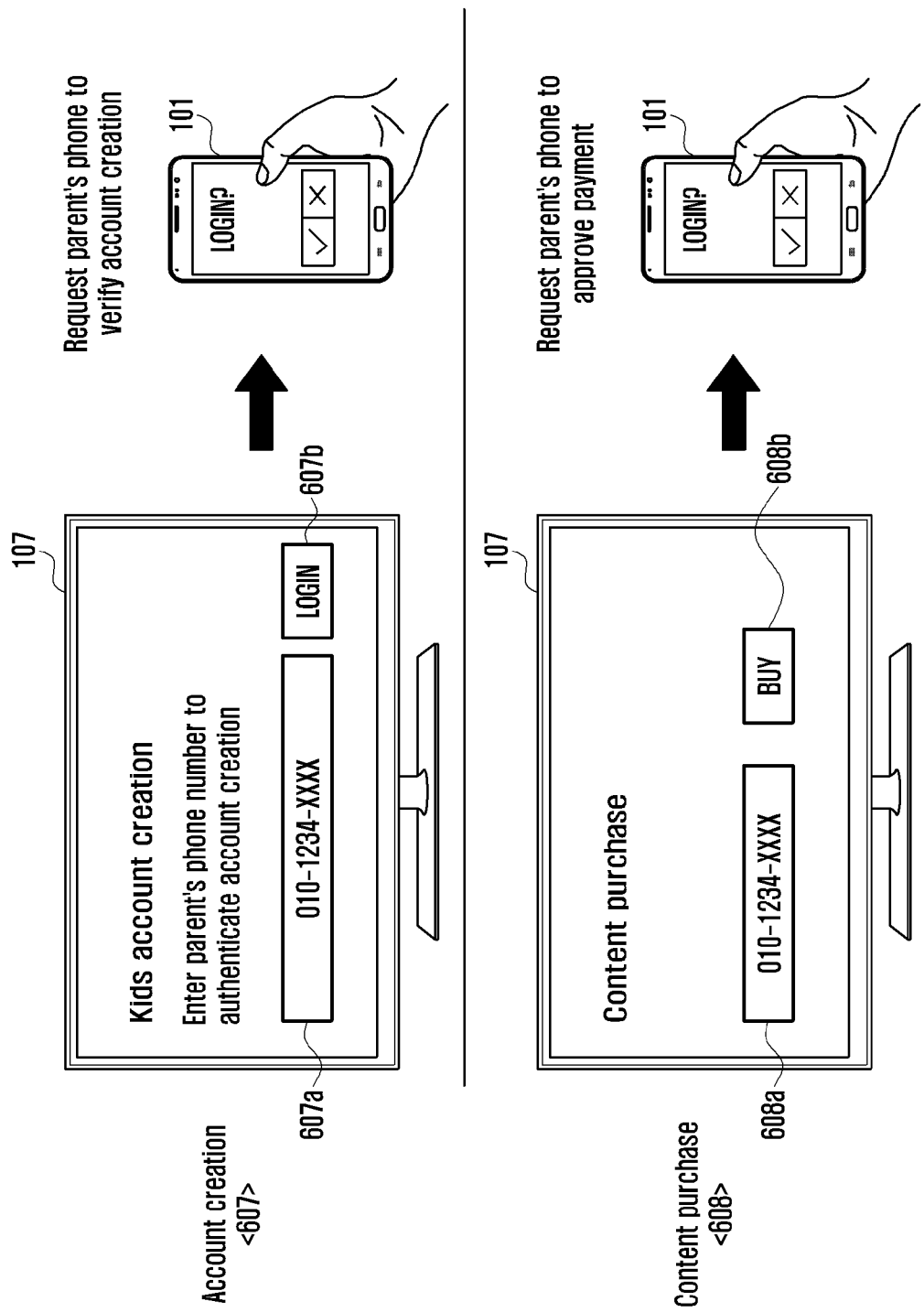
[Fig. 6D]

[Fig. 7A]
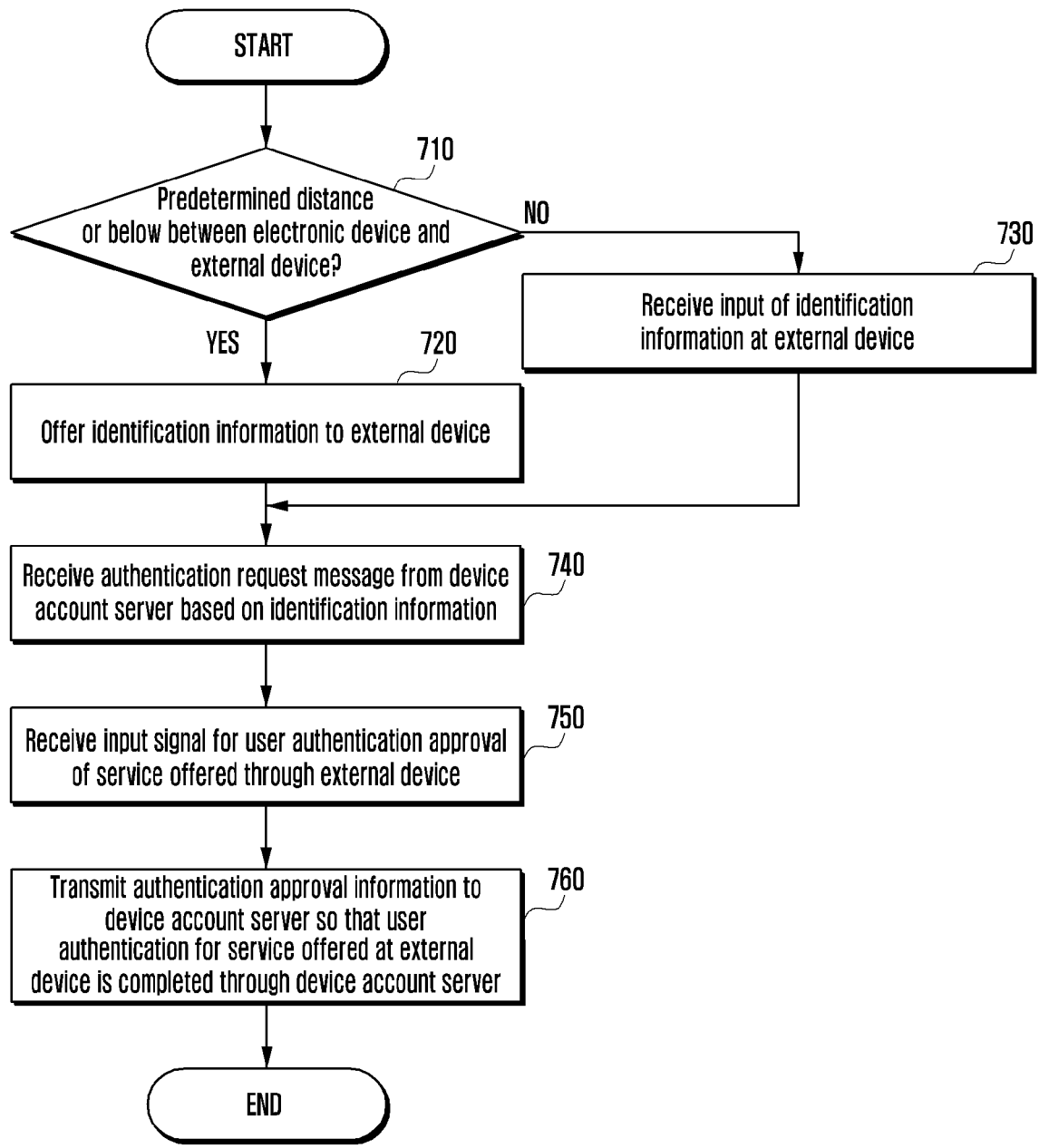

[Fig. 7B]
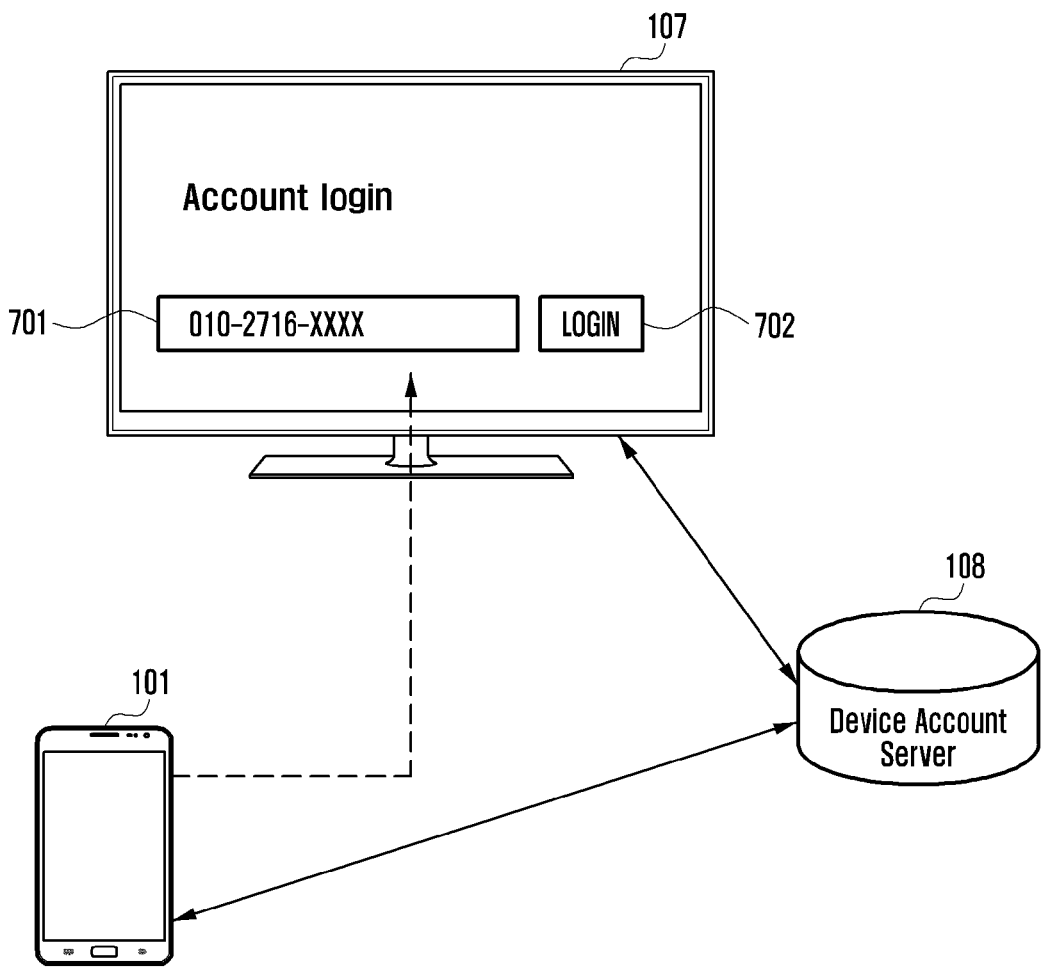

[Fig. 7C]
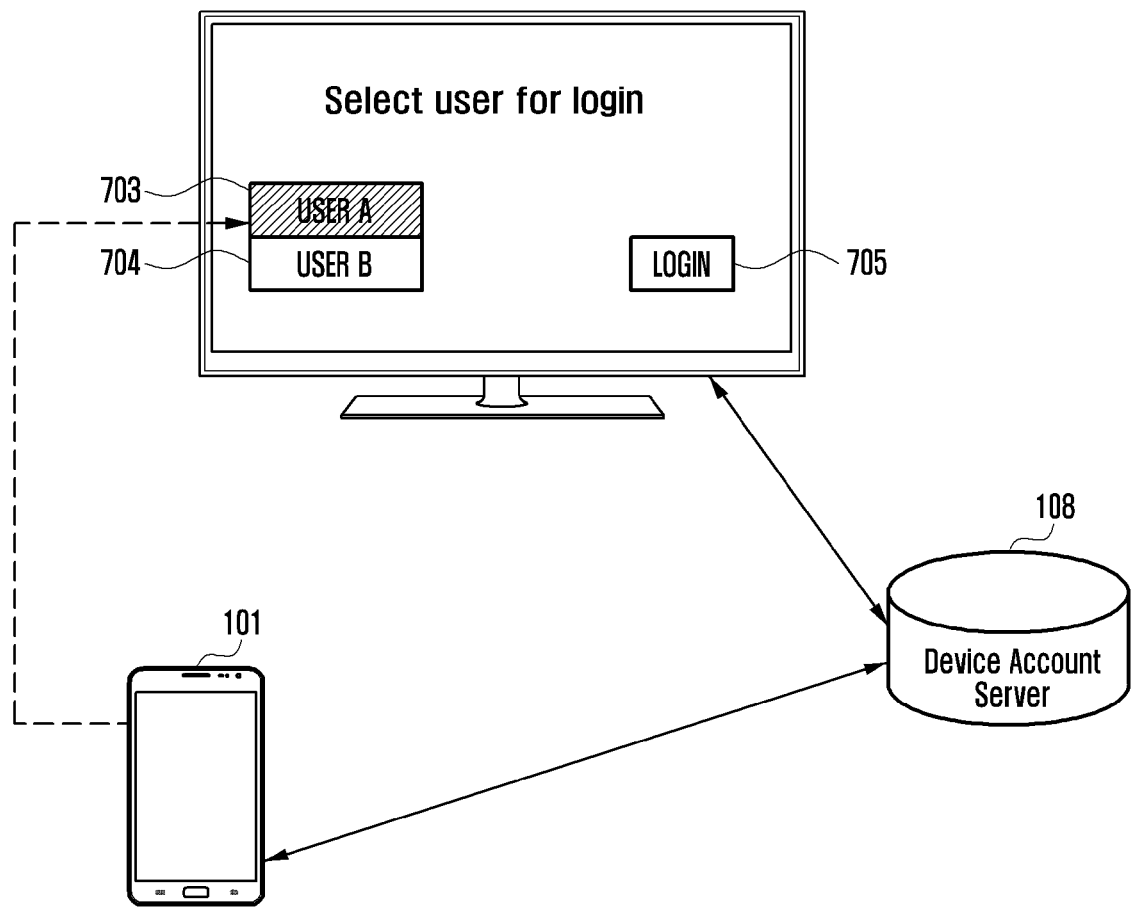

[Fig. 7D]
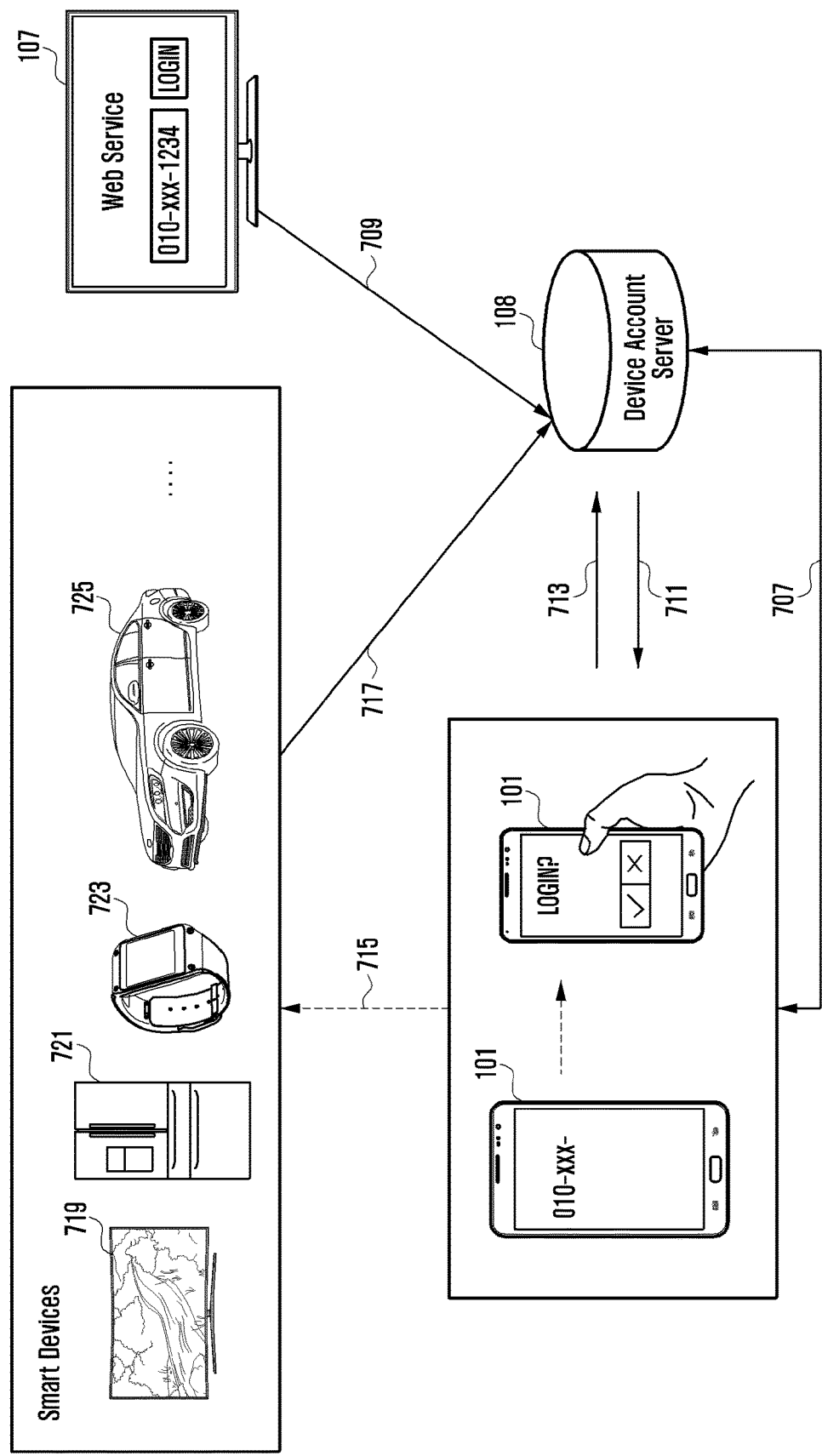

[Fig. 8A]
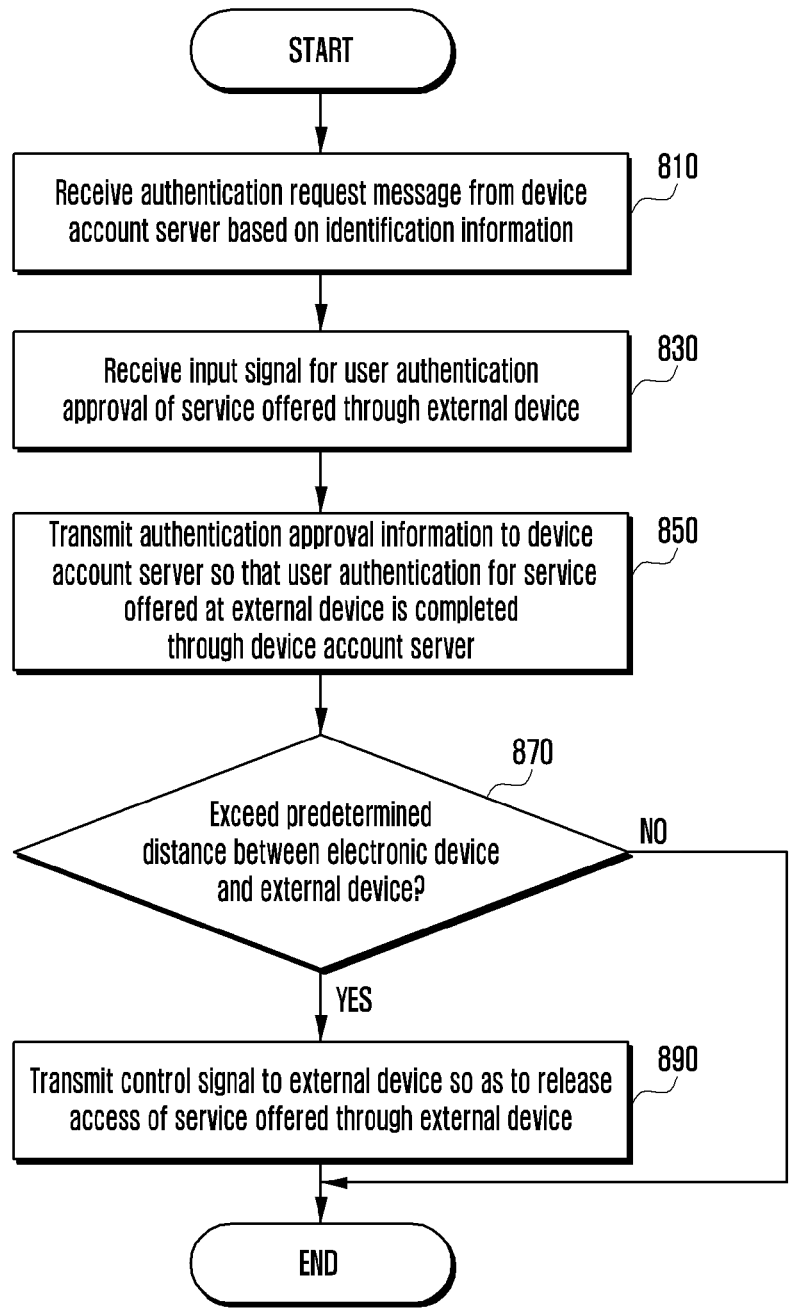

[Fig. 8B]
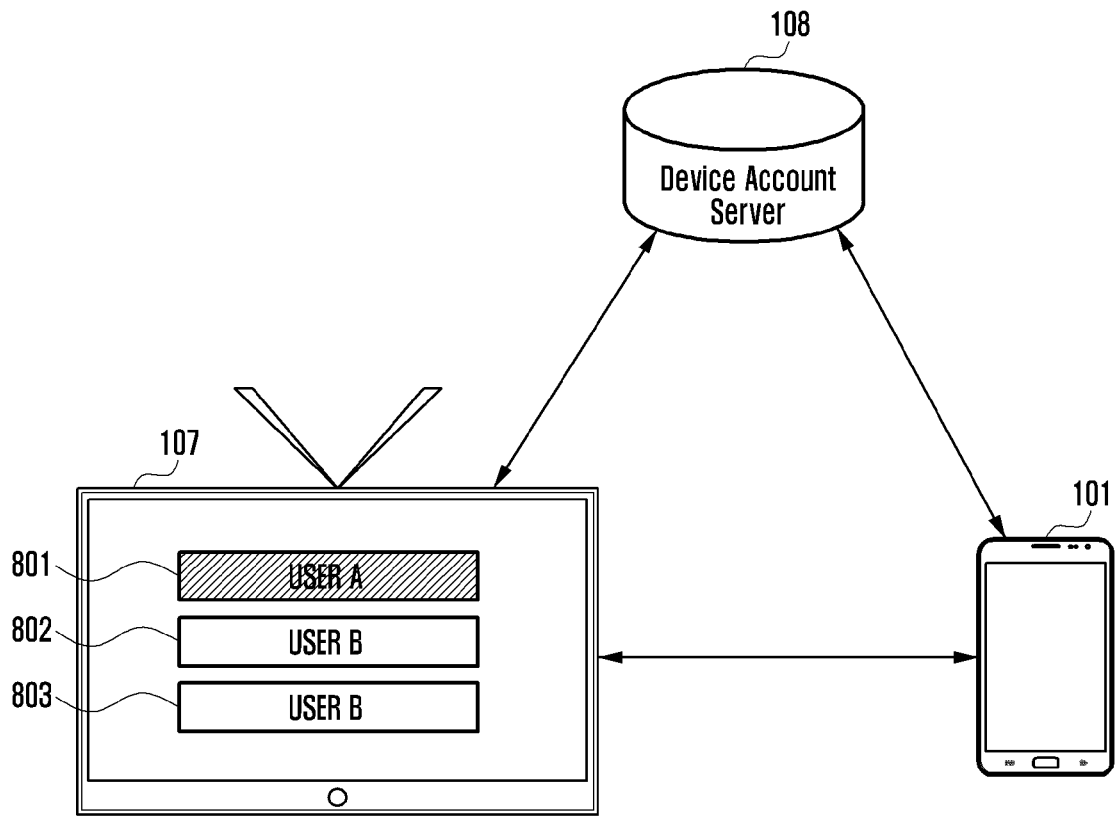
[Fig. 9]
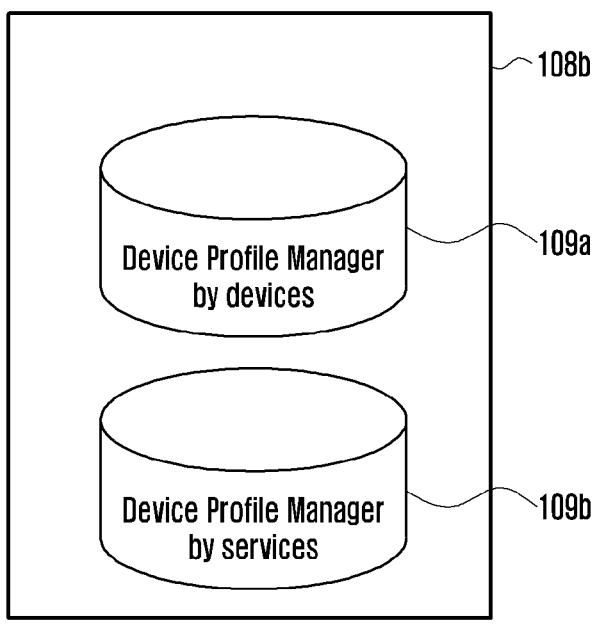

[Fig. 10A]
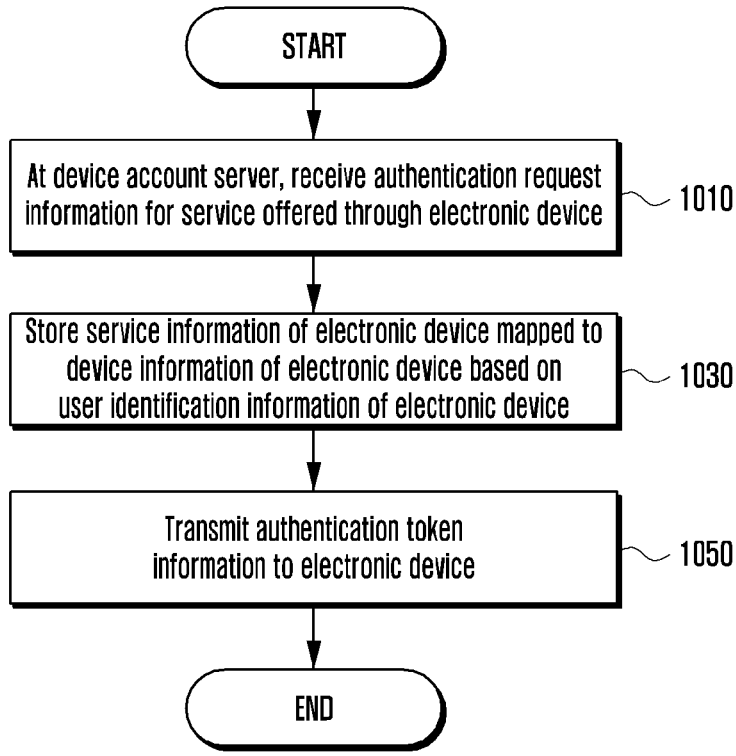
[Fig. 10B]
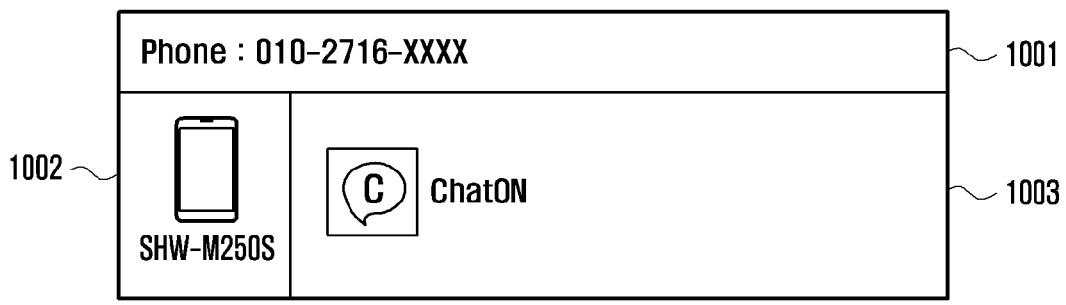

[Fig. 11A]
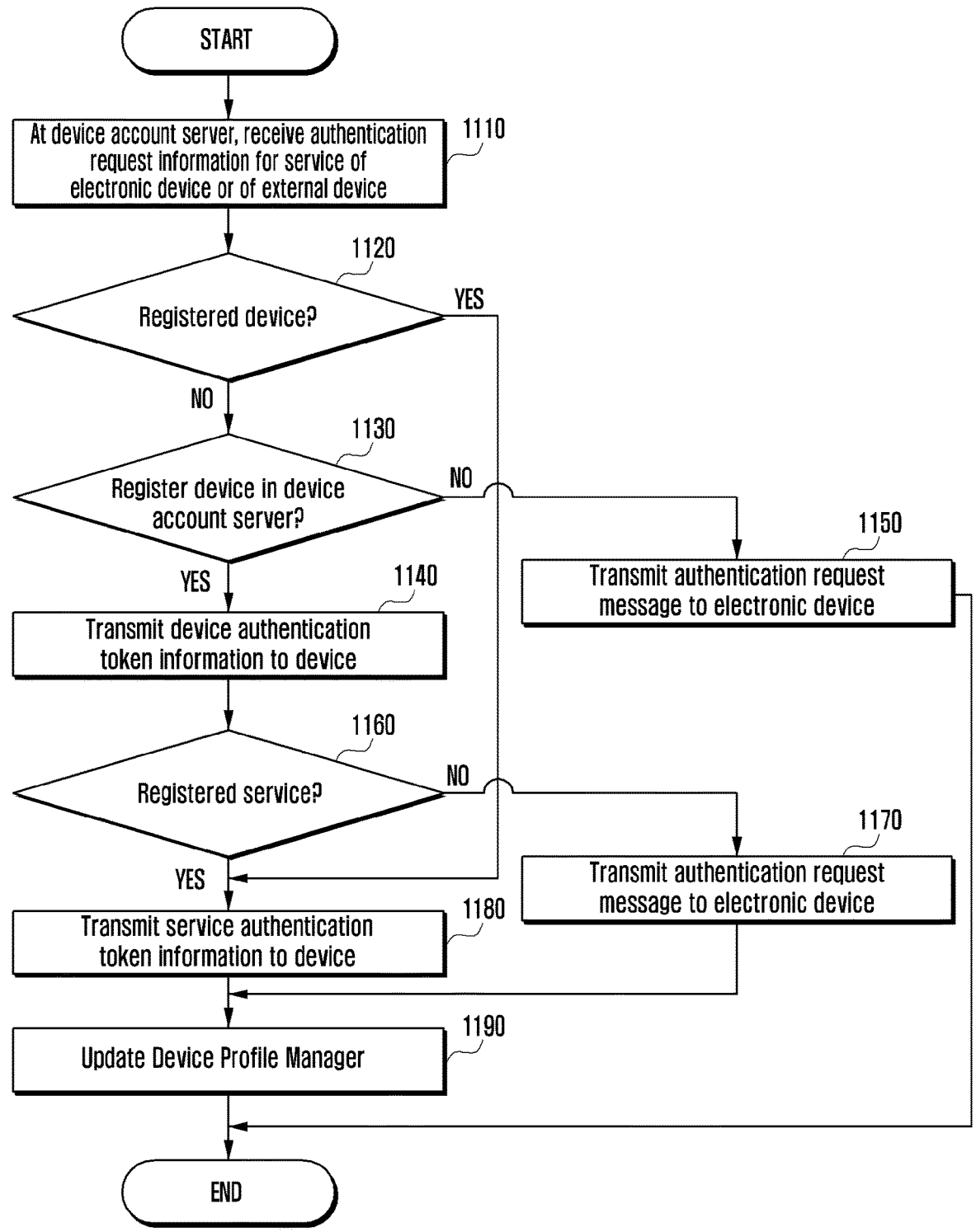

[Fig. 11B]
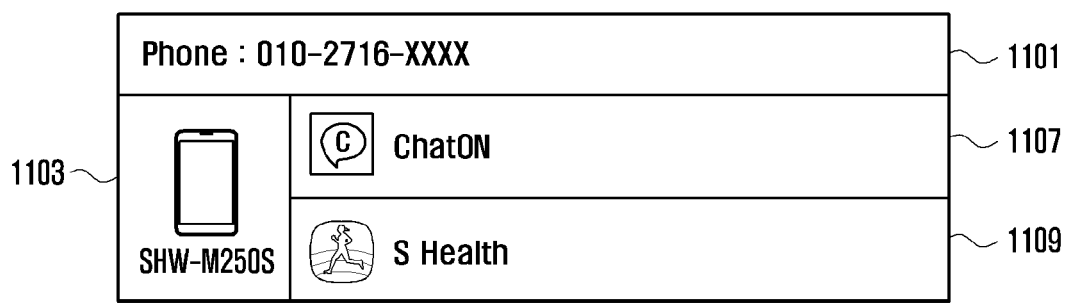
[Fig. 11C]
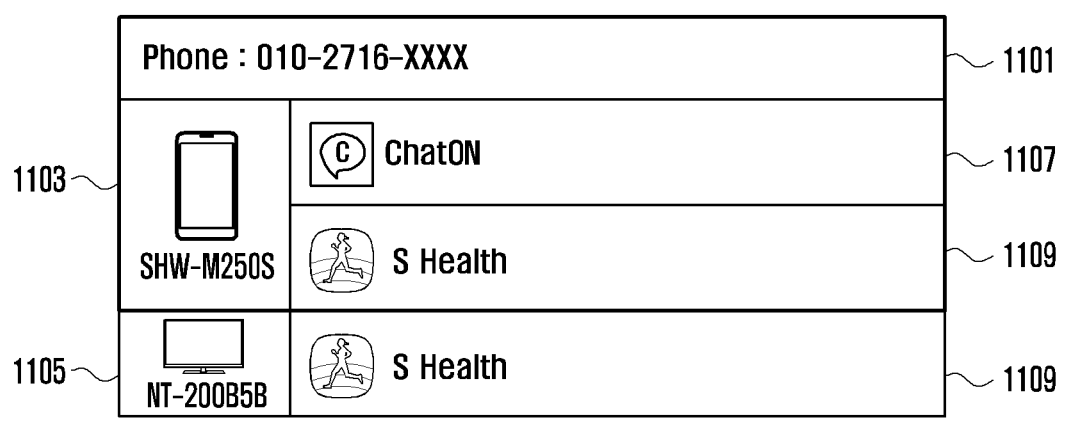
[Fig. 11D]
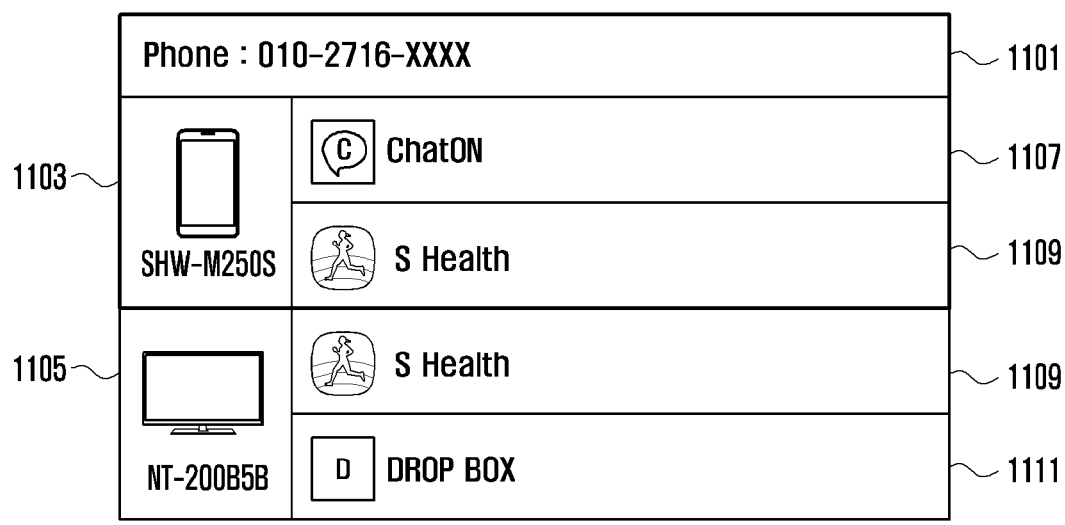

[Fig. 11E]
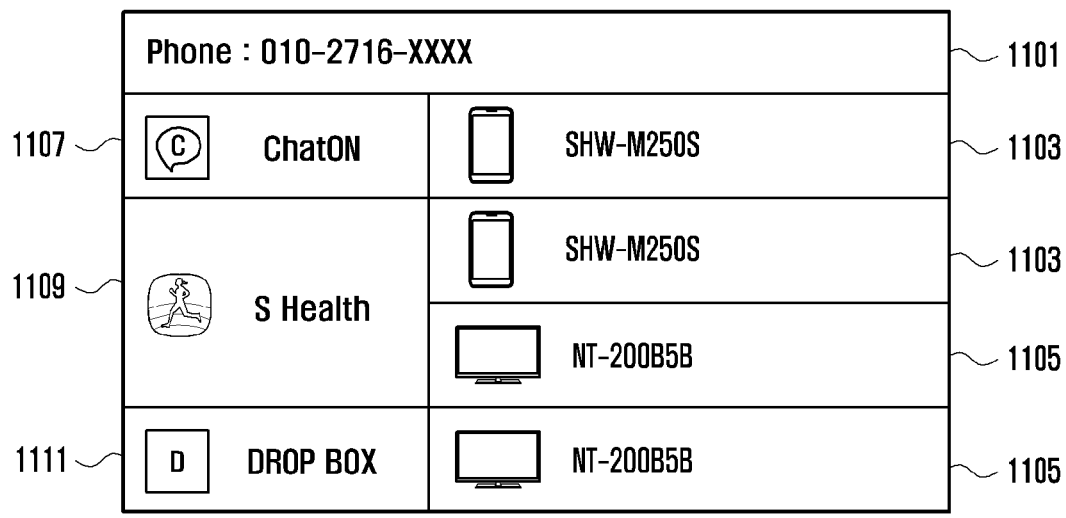
[Fig. 12A]
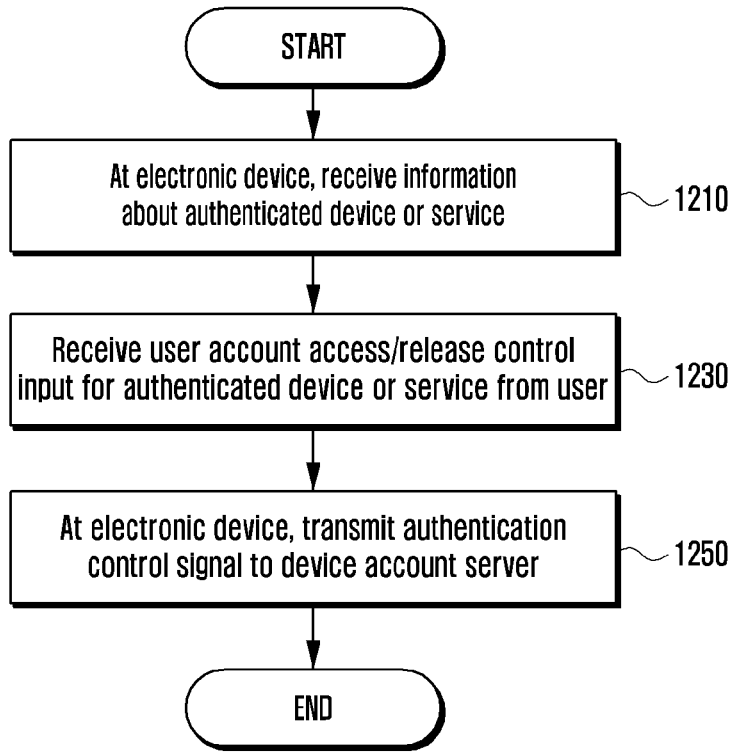

[Fig. 12B]
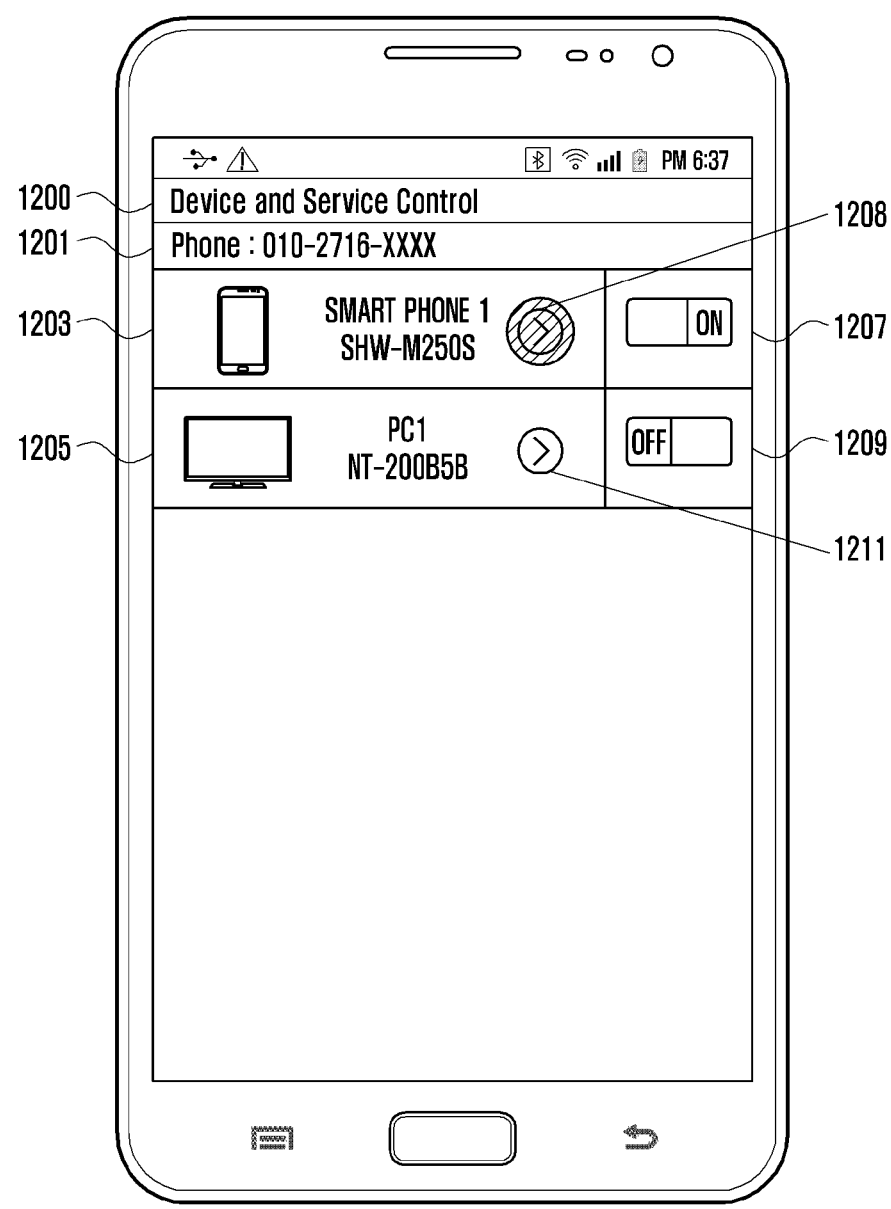

[Fig. 12C]
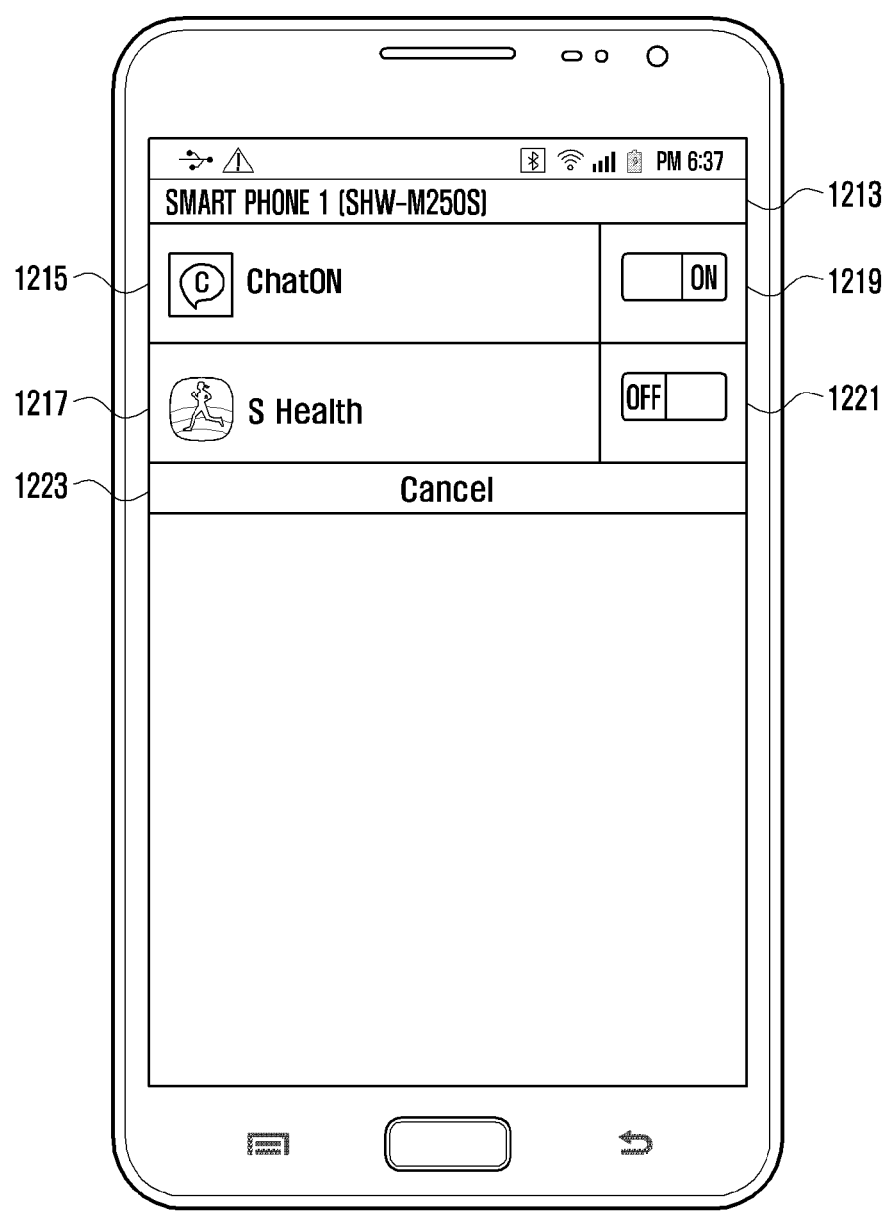

[Fig. 12D]
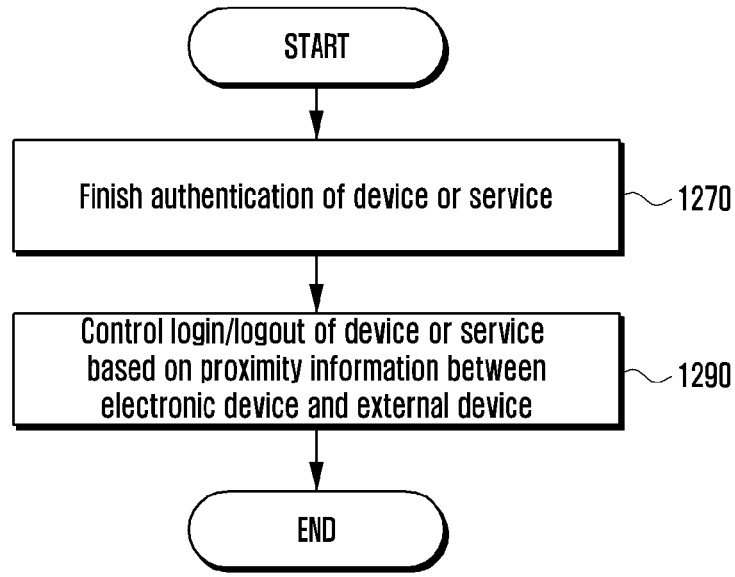
[Fig. 13A]
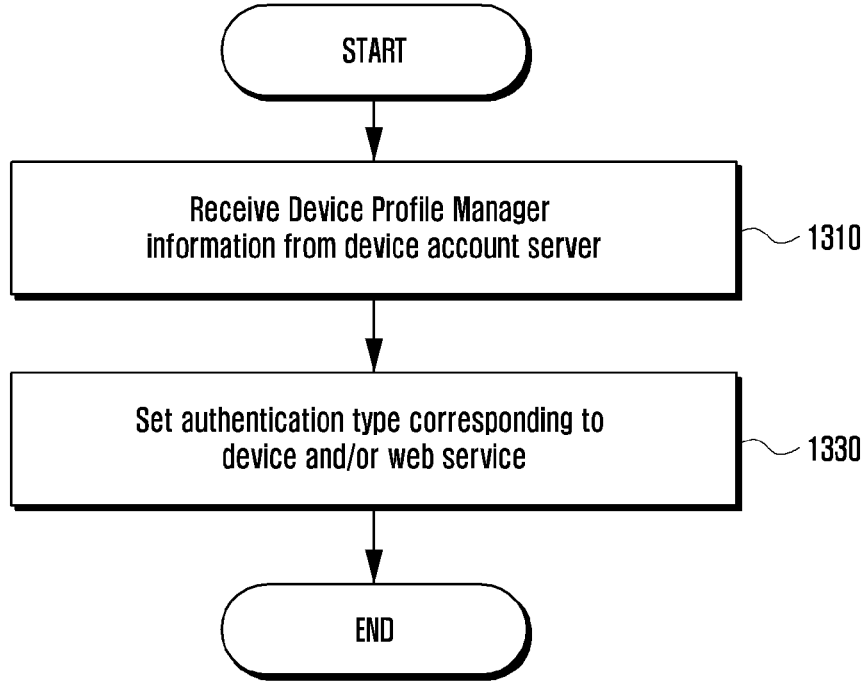

[Fig. 13B]
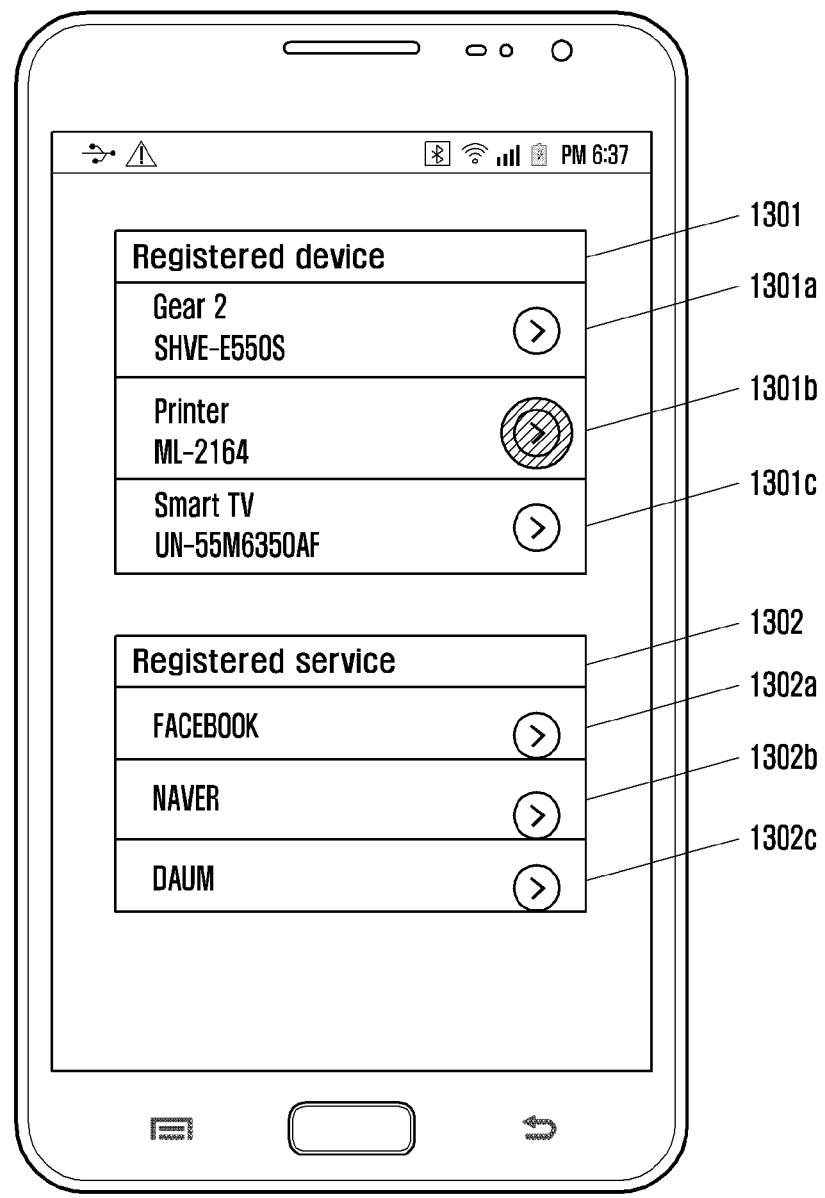

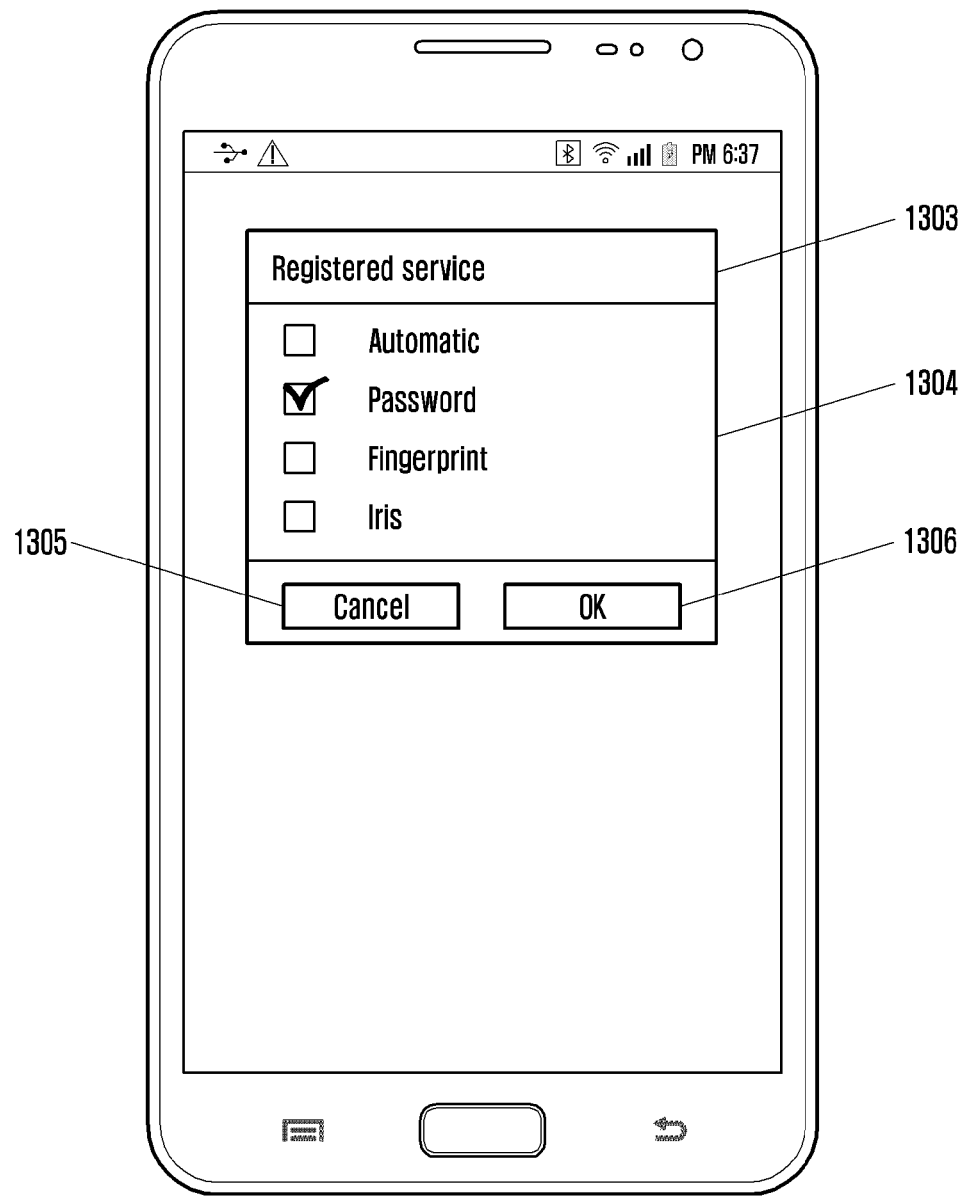
[Fig. 13C]

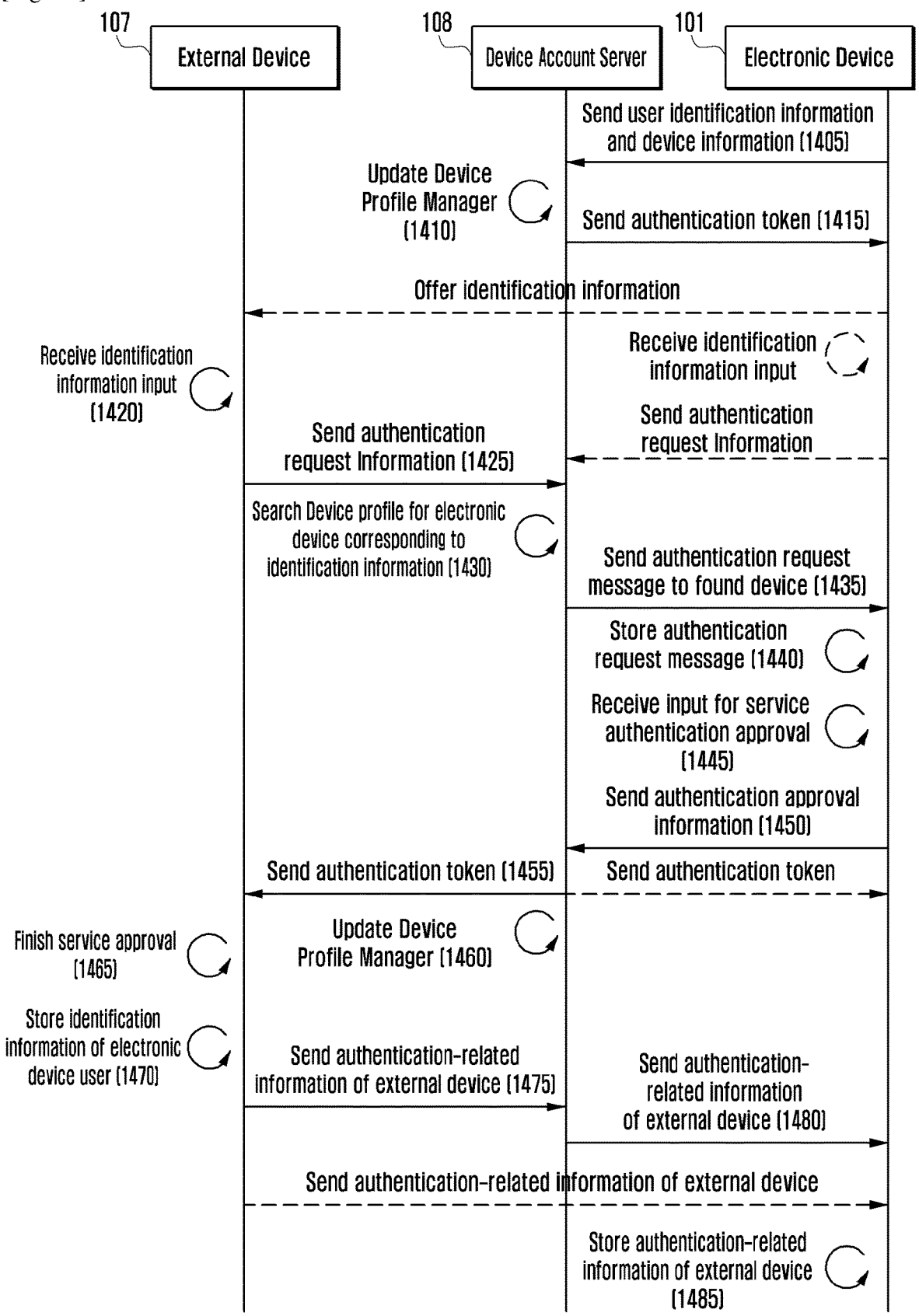
[Fig. 14]

METHOD FOR AUTHENTICATION AND ELECTRONIC DEVICE SUPPORTING THE SAME

CROSS-REFERENCE TO RELATED APPLICATION(S)

The present application claims priority under 35 U.S.C. § 365 to International Patent Application No. PCT/KR2015/010884 filed Oct. 15, 2015, entitled "METHOD AND FOR AUTHENTICATION AND ELECTRONIC DEVICE SUPPORTING THE SAME", and, through International Patent Application No. PCT/KR2015/010884, to Korean Patent Application No. 10-2014-0139206 filed Oct. 15, 2014 and to Korean Patent Application No. 10-2015-0140632 filed Oct. 6, 2015, each of which are incorporated herein by reference into the present disclosure as if fully set forth herein.

TECHNICAL FIELD

Various embodiments of the present invention relate to an authentication method and an electronic device that supports the method.

BACKGROUND ART

Normally, user authentication technique based on ID and password is used for access to a specific electronic device, a specific web service, and the like. For example, a user who desires to access a desired device or service inputs his or her ID and password for user authentication. If this input is identical to data stored earlier in a management server or the like, user authentication is completed and user access is approved.

DISCLOSURE OF INVENTION

Technical Problem

In such user authentication technique, IDs and/or passwords may be set differently for respective devices and/or services. In this case, a user may often forget or confuse such IDs and/or passwords. Further, the format, length or allowable element type of ID and/or password may be varied depending devices and services. This may add to user's confusion.

Additionally, some electronic devices such as TV are now requiring a simple user authentication method for the device or a particular service offered by the device.

Accordingly, in order to address the aforesaid or any other issue, various embodiments of the present invention provide an authentication method based on identification information of an electronic device user and also provide an electronic device that supports the method.

Solution to Problem

According to various embodiments, an authentication method includes operations of: at an electronic device, receiving an authentication request message based on identification information from a server apparatus; at the electronic device, in response to the authentication request message, receiving at least one of an input for authentication approval of a specific device and an input for authentication approval of a service offered through the specific device; and at the electronic device, in response to the input, transmitting authentication approval information to the server apparatus.

According to various embodiments, an electronic device includes: a communication interface; a display; and a processor configured to: receive an authentication request message based on identification information from a server apparatus through the communication interface, in response to the authentication request message, receive, through the display, at least one of an input for authentication approval of a specific device and an input for authentication approval of a service offered through the specific device, and in response to the input, transmit authentication approval information to the server apparatus through the communication interface.

According to various embodiments, an authentication method includes operations of: at a server apparatus, receiving, from a specific device, at least one of authentication request information for the specific device and authentication request information for a service offered through the specific device; at the server apparatus, identifying an electronic device, based on identification information contained in the authentication request information, creating an authentication request message, and transmitting the authentication request message to the electronic device; at the server apparatus, receiving, from the electronic device, at least one of an input for authentication approval of the specific device and an input for authentication approval of a service offered through the specific device; and at the server apparatus, transmitting authentication token information created in response to the input to the specific device.

According to various embodiments, a server apparatus includes: a communication interface; and a processor configured to: receive, from a specific device through the communication interface, at least one of authentication request information for the specific device and authentication request information for a service offered through the specific device, create and transmit an authentication request message to an electronic device identified according to identification information contained in the authentication request information, receive, from the electronic device through the communication interface, at least one of an input for authentication approval of the specific device and an input for authentication approval of a service offered through the specific device, and transmit authentication token information created in response to the input to the specific device.

According to various embodiments, an authentication method includes operations of: at an external device, receiving an input of identification information; at the external device, creating at least one of authentication request information for the external device and authentication request information for a service offered through the external device, based on the identification information, and transmitting the created authentication request information to a server apparatus; at the external device, receiving authentication token information from the server apparatus; and at the external device, finishing at least one of authentication for the external device and authentication for a service offered through the external device according to the authentication token information.

According to various embodiments, an authentication method includes operations of: at an external device, receiving an input of identification information, creating at least one of authentication request information for the external device and authentication request information for a service offered through the external device, based on the identification information, and transmitting the created authentication request information to a server apparatus; at the server apparatus, identifying an electronic device, based on the authentication request information, creating an authentication request message, and transmitting the authentication request message to the electronic device; at the electronic device, in response to the authentication request message, receiving at least one of an input for authentication approval of the external device and an input for authentication approval of a service offered through the external device; at the electronic device, in response to the input, creating and transmitting authentication approval information to the server apparatus; at the server apparatus, creating authentication token information based on the authentication approval information and transmitting the authentication token information to the external device; and at the external device, by receiving the authentication token information, finishing at least one of authentication for the external device and authentication for a service offered through the external device.

Advantageous Effects of Invention

The authentication method according to various embodiments of this invention, based on user identification information of the electronic device, may allow a user to simply complete user authentication at a device or service.

Additionally, according to various embodiments of this invention, since the device account server builds a database with authentication information created in the authentication process for a device or service and then transmits it to the electronic device, the electronic device can easily control user access/release at the device or service.

BRIEF DESCRIPTION OF DRAWINGS

FIG. 1 is a schematic diagram illustrating a network environment including an electronic device according to an embodiment of the present invention.

FIG. 2 is a block diagram illustrating an electronic device according to various embodiments of the present invention.

FIG. 3 is a block diagram illustrating a program module according to various embodiments of the present invention.

FIGS. 4A to 4C are schematic diagrams illustrating a network environment including an electronic device according to an embodiment of the present invention.

FIG. 5A is a block diagram illustrating elements of a processor according to an embodiment of the present invention.

FIG. 5B is a block diagram illustrating elements of a device account server according to an embodiment of the present invention.

FIG. 6A is a flow diagram illustrating an authentication method for a device and/or a service according to an embodiment of the present invention.

FIGS. 6B to 6D are exemplary diagrams illustrating operations shown in FIG. 6A.

FIG. 7A is a flow diagram illustrating operations of, at an electronic device, offering user identification information to an external device according to an embodiment of the present invention.

FIGS. 7B and 7C are exemplary diagrams illustrating operations shown in FIG. 7A.

FIG. 7D is an exemplary diagram illustrating operations of, at an electronic device and a device account server, performing authentication for additional electronic devices according to various embodiments of the present invention.

FIG. 8A is a flow diagram illustrating operations of, at an electronic device, offering an access release control signal to an external device according to an embodiment of the present invention.

FIG. 8B is an exemplary diagram illustrating operations shown in FIG. 8A.

FIG. 9 is a block diagram illustrating a device profile manager of a device account server according to an embodiment of the present invention.

FIG. 10A is a flow diagram illustrating a process of, at a device account server, performing authentication for a service requested by an electronic device according to an embodiment of the present invention.

FIG. 10B is an exemplary diagram illustrating a process of updating a device profile manager of a device account server according to operations shown in FIG. 10A.

FIG. 11A is a flow diagram illustrating a process of, at a device account server, performing user authentication for a device or a service according to an embodiment of the present invention.

FIGS. 11B to 11E are exemplary diagrams illustrating a process of updating a device profile manager of a device account server according to operations shown in FIG. 11A.

FIG. 12A is a flow diagram illustrating a process of, at an electronic device, controlling a device or a service through a device account server according to an embodiment of the present invention.

FIGS. 12B and 12C are exemplary diagrams illustrating operations shown in FIG. 12A.

FIG. 12D is an exemplary diagram illustrating operations of, at an electronic device, controlling login/logout of a device or a service on the basis of proximity information with an external device according to an embodiment of the present invention.

FIG. 13A is a flow diagram illustrating a method of, at an electronic device, setting an authentication type for a device or a service according to an embodiment of the present invention.

FIGS. 13B and 13C are exemplary diagrams illustrating operations shown in FIG. 13A.

FIG. 14 is a flow diagram illustrating a user authentication process among an electronic device, an external device, and a device account server according to an embodiment of the present invention.

MODE FOR THE INVENTION

Hereinafter, various embodiments of the present specification will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, electronic tattoo, smart mirror or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a home automation control panel, a security control panel, a TV box (e.g., Samsung HomeSync™, Apple TV™, Google TV™, etc.), a game console, an electronic dictionary, an electronic key, a camcorder, or an electronic picture frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, a Global Navigation Satellite System (GNSS), an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram illustrating a network environment 100 including therein an electronic device 101 in accordance with an embodiment of the present disclosure.

Referring to FIG. 1, the electronic device 101 may include, but not limited to, a bus 110, a processor 120, a memory 130, an input/output interface 140, a display 150, a communication interface 160, and an application control module 170. In some embodiments, at least one of the elements of the electronic device 101 may be omitted or other elements may be additionally included in the electronic device 101.

The bus 110 may include, for example, a circuit which interconnects the elements 110 to 170 and delivers a communication (e.g., a control message and/or data) between the elements 110 to 170.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The processor 120 may control the whole operations of the electronic device 101 and a signal flow between internal elements of the electronic device 101 and also perform a data processing function for processing data. The processor 120 may control each element of the electronic device 101 to support an authentication method for a device or service according to embodiments of this invention.

The memory 130 may include a volatile memory and/or a non-volatile memory. The memory 130 may store, for example, instructions or data relevant to at least one other element of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The memory 130 may store commands or data received from the processor 120 or other elements. Also, the memory 130 may store commands or data created by the processor 120 or other elements. The above-discussed program 140 may be formed of software, firmware, hardware, or any combination thereof.

According to various embodiments, the memory 130 may store authentication request message received from a device account server 108 for user authentication of a device or service. Additionally, the memory 130 may store authentication history information of the electronic device 101, and access/release state information of a device or service. The access/release state information may information about user's login or logout at such a device or service. The memory 130 may store information about an authentication type which is set for at least one external device 107. In order to offer user identification information to the external device 107, the electronic device 101 may store a predetermined distance value in the memory 130. The memory 130 may store communication connection information such as pairing information of the external device 107.

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may perform intermediation by which the API 145 or the application 147 communicates with the kernel 141 to transmit or receive data.

In addition, the middleware 143 may process one or more task requests received from the application programs 147 according to priorities thereof. For example, the middleware 143 may assign a priority, which enables the use of system resources (e.g., the bus 110, the processor 120, the memory 130, etc.) of the electronic device 101, to at least one of the application programs 147. For example, the middleware 143 may perform scheduling or loading balancing on the one or more task requests by processing the one or more task requests according to the priorities assigned thereto.

The API 145 which is an interface for allowing the application 147 to control a function provided by the kernel 141 or the middleware 143 may include, for example, at least one interface or function (e.g., a command) for a file control, a window control, an image processing, a text control, and the like.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The input/output interface 150 may receive an input of numbers and/or letters and may include a plurality of input keys and function keys for setting various functions. Such function keys may include navigation keys, side keys, shortcut keys, etc. each of which is defined to perform a particular function. The input/output interface 150 may create a key signal entered in connection with user setting and function control of the electronic device 101 and then transmit the created signal to the processor 120. The input/output interface 150 may be implemented as a touch screen. The touch screen may be formed of liquid crystal display (LCD), organic light emitting diode (OLED), or the like, and may be included in the input/output interface 150. For example, the input/output interface 150 may include a panel, sheet or digitizer capable of receiving a touch input, a proximity touch input, a gesture input, an electronic pen input, and the like.

According to various embodiments, the input/output interface 150 may receive, from a user, an input signal for user authentication of a device or service. The input/output interface 150 may also receive, from a user, information for controlling an account based on user identification information of the electronic device 101 to be logged in or logged out at the external device 107. The input/output interface 150 may receive, from a user, an input signal for setting an authentication type for at least one device and/or at least one service.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. For example, the display 160 may display various pieces of content (e.g., text, images, videos, icons, symbols, etc.) to the user. The display 160 may include a touch screen, and for example, receive a touch, gesture, proximity, or hovering input using an electronic pen or a body part of a user.

The display 160 may offer a screen interface associated with various screens, for example, an idle screen, a memo screen, a call screen, etc., according to the use of the electronic device 101. In case the display 160 is implemented as a touch screen, the screen of the display 160 may operate as the input/output interface 150.

According to various embodiments, the display 160 may display an authentication request message received from the device account server 108. When authentication of a device or service is completed, the display 160 may show at least one device and/or at least one service received from the device account server 108. Also, the display 160 may display a user's access/release state at a device or service received from the device account server 108. And also, the display 160 may display a control screen for setting an authentication type with regard to at least one device and/or at least one service.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use, as a cellular communication protocol, for example, at least one of LTE, LTE-A, CDMA, WCDMA, UMTS, WiBro, GSM, and the like. The wired communication may include, for example, at least one of a universal serial bus (USB), a high definition multimedia interface (HDMI), a recommended standard 232 (RS-232), a plain old telephone service (POTS), and the like. The network 162 may include, as a telecommunication network, for example, at least one of a computer network (e.g., LAN or WAN), an internet, and a telephone network.

The communication interface 170 may establish a communication connection with other electronic devices or servers connected to the electronic device 101 through the network and also perform transmission and reception of data. The communication interface 170 may include, for example, a cellular module, a WiFi module, a Bluetooth module, a GPS module, an NFC module, a mobile network module, and/or an RF module. According to an embodiment, the communication interface 170 may establish a communication connection with the external device 107 or the device account server 108. Through this, the communication interface 170 may share various kinds of information required for user authentication of a device or service with the external device 107 or the device account server 108.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request to perform at least some functions relating thereto to another device (e.g., the electronic device 102 or 104 or the server 106) instead of performing the functions or services by itself or additionally. The other electronic device (e.g., the electronic device 102 or 104 or the server 106) may carry out the requested functions or the additional functions and transfer the result to the electronic device 101. The electronic device 101 may process the received result as it is or additionally to provide the requested functions or services. To achieve this, for example, cloud computing, distributed computing, or client-server computing technology may be used.

FIG. 2 is a block diagram illustrating an electronic device according to various exemplary embodiments. For example, the electronic device 201 may include the entirety or a part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GPS module 227, an NFC module 228, and a Radio Frequency (RF) module 229.

The cellular module 221 may offer a voice call, a video call, a message service, an internet service, or the like through a communication network. Additionally, the cellular module 221 may perform identification and authentication of the electronic device in the communication network, using the SIM card 224. According to an embodiment, the cellular module 221 may perform at least part of functions the AP 210 can provide. According to an embodiment, the cellular module 221 may include a communication processor (CP).

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), an antenna or the like. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device. The SIM card 224 may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like.

The external memory 234 may be functionally connected to the electronic device 200 through various interfaces.

According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

According to various embodiments, the sensor module 240 may measure a distance to the external device 107. Also, through the sensor module 240, the electronic device 101 may recognize a gesture, a fingerprint input, an iris input, or the like for user authentication of a device or service.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 160) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

According to an embodiment, the audio module 280 may deliver user voice information to the processor 120 to recognize a user voice as input information for user authentication.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

FIG. 3 is a block diagram illustrating a program module according to various exemplary embodiments. According to an embodiment of the present disclosure, a program module 310 (for example, the program 140) may include an Operating System (OS) for controlling resources related to an electronic device (for example, the electronic device 101) and/or various applications (for example, the application program 147) executed in the operating system. The operating system may be, for example, Android, iOS, Windows, Symbian, Tizen, Bada, or the like.

The program module 310 may include a kernel 320, a middleware 330, an application programming interface (API) 360, and/or an application 370. At least part of the program module 310 may be preloaded on the electronic device or downloaded from a server (e.g., the server 106).

The kernel 320 (e.g., the kernel 141) may include, for example, a system resource manager 321 and/or a device driver 323. The system resource manager 321 may perform the control, allocation, retrieval, or the like of system resources. According to one embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add a new function by using a programming language during the execution of the application 370. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device (for example, the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The application 370 (for example, the application 134) may include one or more applications capable of performing a function of, for example, a home 371, a dialer 372, SMS/MMS 373, an Instant Message (IM) 374, a browser 375, a camera 376, an alarm 377, a contact 378, a voice dialer 379, an email 380, a calendar 381, a media player 382, an album 383, and a clock 384. Additionally or alternatively, the application 370 may include one or more applications capable of performing a function of, for example, health care (for example, a measurement of an exercise quantity or blood sugar) or environment information provision (for example, provision of atmospheric pressure, humidity, or temperature information).

According to an embodiment of the present disclosure, the applications 370 may include an application (hereinafter, referred to as an "information exchange application" for the convenience of description) supporting information exchange between the electronic device (e.g., the electronic device 101) and an external electronic device (e.g., the electronic device 102 or 104). The application associated with information exchange may include, for example, a notification relay application for forwarding specific information to an external electronic device, or a device management application for managing an external electronic device.

For example, the notification relay application may include a function of delivering, to the external electronic device (e.g., the electronic device 102 or 104), notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device (for example, the electronic device 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment of the present disclosure, the application 370 may include an application (e.g., a health care application of a mobile medical device or the like) designated according to an attribute of the external electronic device (e.g., the electronic device 102 or 104). According to an embodiment, the applications 370 may include an application received from the external electronic device (for example, the server 106, or the electronic device 102 or 104). According to an embodiment of the present disclosure, the applications 370 may include a preloaded application or a third party application that may be downloaded from a server. The names of the elements of the program module 310 according to the embodiment illustrated in FIG. 28 may vary according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the AP 210). At least some of the program module 310 may include, for example, a module, a program, a routine, a set of instructions, and/or a process for performing one or more functions.

FIGS. 4A to 4C are schematic diagrams illustrating a network environment including an electronic device according to an embodiment of the present invention. The network environment may include an electronic device 101, an external device 107, and a device account server 108.

In this invention, the electronic device 101 may support user authentication of a device or service. A "device" may include at least one of the external device 107 and the electronic device 101, and may be sometimes referred to as a specific device hereinafter. A "service" indicated by 101a or 107a may be offered through the electronic device 101 and/or the external device 107 and may include a web service. This service may include the first service, the second service and the N-th service, which may be equal to or different from each other.

The term "identification information of the electronic device 101" set forth herein refers to unique information for identifying the electronic device 101 and may include device information of the electronic device 101.

The term "user identification information" set forth herein refers to unique information for identifying a user of a specific electronic device (e.g., the electronic device 101).

According to an embodiment, the electronic device 101 may register both the identification information (e.g., device information) of the electronic device 101 and user identification information in the device account server 108 so as to support user authentication of a device or service. This registration process may refer to the entire process for implementing various embodiments disclosed herein. For example, the electronic device 101 and the device account server 108 may use a SMS-based bidirectional messaging service (i.e., mobile oriented) or a unidirectional messaging service (i.e., mobile terminated) so as to register device information of the electronic device 101 and user identification information in the device account server 108. This is, however, exemplary only and not to be considered as a limitation. Alternatively, using various network systems, the electronic device 101 may register device information of the electronic device 101 and user identification information in the device account server 108.

According to an embodiment, identification information (including device information) of the electronic device 101 may contain a model name of the electronic device 101, information about hardware or software equipped or installed in the electronic device 101, and the like. Specifically, device information of the electronic device 101 may include device specific information, such as international mobile equipment identity (IMEI), international mobile subscriber identity (IMSI), unique device identifier (UDID), universally unique identifier (UUID), etc., normal information, such as a model name of the device, hardware version information, software version information, etc., hardware information of the device, and/or any combination thereof. Here, hardware information may contain a network type such as Bluetooth, WiFi, and the like available for the device, information (e.g., type) about various hardware components such as a camera, an LCD, a CPU, a memory, etc. equipped in the device, and the like.

According to an embodiment, user identification information may be unique information for identifying a user of the electronic device 101. For example, user identification information may contain a resident registration number of a user of the electronic device 101, an email address of the user, a phone number (e.g., a mobile phone number, and/or a telephone number) of the user, biometric information of the user, and any combination thereof. Here, biometric information may include, for example, fingerprint information, voice information, pulse information, and/or iris information.

According to an embodiment, identification information of the electronic device 101 and/or user identification information may be included in identification information. For example, identification information may be specific information used for identifying the electronic device 101 and/or a user thereof. In various embodiments, identification information may include at least one kind of information contained in identification information of the electronic device 101 and/or at least one kind of information contained in user identification information.

According to an embodiment, identification information may include an access key which can be dynamically created. For example, the electronic device 101 or the device account server 108 may create dynamically an access key and use the created access key as identification information required for authentication. In various embodiments, this access key may be created dynamically, based on the above-discussed user identification information and/or identification information of the electronic device 101. Additionally, the access key may be created dynamically, based on information about peripheral electronic devices, context information, or the like. According to an embodiment, such a key may be created in response to a request for authentication.

According to various embodiments, the electronic device 101 or the device account server 108 may create the access key on the basis of identification information of the electronic device 101, user identification information of the electronic device 101, peripheral electronic device information, and/or context information in response to a request for creation of an access key. Such an access key may be created in the form of numbers, letters or any combination thereof which can be recognized by a user. The created access key may be outputted at the electronic device 101 or the device account server 108 so as to be recognized by a user, and may also be transmitted to the external device 107 through short range communication. According to various embodiments, in case of creating an access key, the electronic device 101 offers identification information (including device information) thereof or user identification information of the electronic device 101, which corresponds to the created access key, to the device account server 108 so that the device account server 108 can identify the electronic device 101 in authentication using the access key.

According to various embodiments, the access key may contain information allowing the device account server 108 to identify the electronic device 101. For example, the access key may contain identification information of the electronic device 101 and/or user identification information of the electronic device 101. When the access key is received, the device account server 108 may analyze information contained in the access key and then transmit an authentication request message to the electronic device 101. For example, the device account server 108 may identify the electronic device 101 according to device information of the electronic device 101 contained in the access key and then transmit an authentication request message to the identified electronic device 101. In another example, the device account server 108 may identify device information matching to user identification information, among device information stored therein, according to user identification information of the electronic device 101 contained in the access key and then transmit an authentication request message to a specific device (e.g., the electronic device 101) corresponding to the identified device information.

According to an embodiment, as shown in FIG. 4A, the electronic device 101 may support user authentication for the external device 107. According to another embodiment, as shown in FIG. 4B, the electronic device 101 may support user authentication for the service 107a offered through the external device 107. In this case, the service 107a offered through the external device 107 may include a service stored in the external device 107 and/or a service usable through a communication module of the external device 107 and a network. According to still another embodiment, as shown in FIG. 4C, the electronic device 101 may support user authentication for the server 101a offered therethrough. This service 101a offered through the electronic device 101 may include a service stored in the electronic device 101 and/or a service usable through a communication module of the electronic device 101 and a network. Namely, an authentication target supportable by the electronic device 101 may be the external device 107, the service 107a offered through the external device 107, and the service 101a offered through the electronic device 101. A detailed description regarding this will be made below.

According to an embodiment, the external device 107 refers to any other electronic device which is different from the electronic device 101. For example, the external device 107 may correspond to the first external electronic device 102 or the second external electronic device 104 which are shown in FIG. 1. Additionally, the external device 107 may be owned by a user of the electronic device 101 or used in common with other users (e.g., a public PC, etc.).

According to an embodiment, the external device 107 may be an authentication target which requests user authentication for the external device 107 or the service 107a offered through the external device 107. The external device 107 may include at least one device that has a user authentication request function and a communication function. For example, the external device 107 may include at least one of smart home appliances, medical appliances, furniture, parts of building or similar construction, and the like.

According to an embodiment, as shown in FIG. 4A, the external device 107 may request user authentication therefor from the device account server 108 and the electronic device 101. For example, an authentication process shown in FIG. 4A may be performed at the initial execution of the external device 107 or for setting user environments in the external device 107.

According to another embodiment, as shown in FIG. 4B, the external device 107 may request user authentication for the service 107a offered therethrough from the device account server 108 and the electronic device 101. For example, an authentication process shown in FIG. 4B may be performed for a specific service offered through a program or application contained in the external device 108 or for a specific web service connected through a network. For example, the external device 107 may include a server for independently providing a service on the network and also include various web services requiring user authentication to allow a user to use a desired service. Additionally, a service offered through the external device 107 may operate in the form of cloud.

According to an embodiment, the external device 107 may receive identification information from a user. According to an embodiment, for user authentication for the external device 107 or the service 107a offered through the external device 107, the external device 107 receive, from a user, identification information containing at least one of identification information of the electronic device 101 or user identification information of the electronic device 101. When such identification information is received, the external device 107 may transmit authentication request information to the device account server 108. This authentication request information is information for requesting user authentication for the external device 107 or the service 107a offered through the external device 107, and may include user identification information of the electronic device 101 and device information of the external device 107. Device information of the external device 107 may contain, for example, a model name of the external device 107, information about hardware or software equipped or installed in the external device 107, and the like. Also, device information of the external device 107 may include service information offered through the external device 107. This service information may be information for allowing the device account server 108 or the electronic device 101 to identify a service. For example, service information may contain a service name and information about hardware or software installed in a service providing apparatus.

According to an embodiment, the device account server 108 may be a subsystem for mediating between the external device 107 and the electronic device 101 and offering an intensive processing function. Also, the device account server 108 may be subsystem for communicating with the electronic device 101 and mediating user authentication for a server offered through the electronic device 101. The device account server 108 may be implemented as a computer or software capable of communicating with the external device 107 and the electronic device 101 to transmit or receive information. The device account server 108 may be included in the server 106 as shown in FIG. 1.

According to an embodiment, the device account server 108 may store, in a device profile manager 108b, user identification information and/or device information of the electronic device 101, device information of the external device 107, service information offered through the external device 107, and/or service information offered through the electronic device 101.

According to an embodiment, when authentication request information is received from the external device 107, the device account server 108 may search the device profile manager 108b for device information of the electronic device 101 mapped to user identification information contained in the received authentication request information. If device information of the electronic device 101 is found in the device profile manager 108b, the device account server 108 may transmit an authentication request message to the electronic device 101. The authentication request message may be a message which is transmitted from the device account server 108 to the electronic device 101 for user authentication for the external device 107 or a service offered through the external device 107. The authentication request message may contain device information of the external device 107 or service information offered through the external device 107. Through this, a user of the electronic device 101 can recognize which device or service sends a request for authentication.

According to another embodiment, as shown in FIG. 4C, the device account server 108 may receive authentication request information from the electronic device 101. In this case, authentication request information may be information about a request for user authentication for a service offered through the electronic device 101. For example, after user authentication for the first service offered through the electronic device 101 is completed, the device account server 108 may receive, from the electronic device 101, authentication request information for the second service offered through the electronic device 101. In this case, the second service may be different from the first service. A related description will be made below.

According to an embodiment, when authentication approval information for a device or service is received from the electronic device 101, the device account server 108 may transmit device authentication token information and/or service authentication token information to a corresponding device (e.g., the electronic device 101 or the external device 107). Device authentication token information may be information indicating that the device account server 108 approves user authentication for a specific device. Service authentication token information may be information indicating that the device account server 108 approves user authentication for a service offered through a specific device. Hereinafter, the term "authentication token information" may refer to at least one of device authentication token information and service authentication token information.

According to an embodiment, the device account server 108 may map and store information, transmitted or received in the authentication process, to the device profile manager. A detailed description regarding the device profile manager will be made below.

According to an embodiment, a device that receives device authentication token information or service authentication token information from the device account server 108 may finish user authentication for the device or the service offered through the device.

Although not shown in FIGS. 4A to 4C, the device account server 108 may include a communication interface capable of communicating with the electronic device 101 or the external device 107. Also, the device account server 108 may include an input/output interface for receiving or outputting control information associated with the device profile manager 108b from or to a user. And also, the device account server 108 may include a memory. Further, the device account server 108 may include at least one processor for controlling a signal flow among the device profile manager 108b, the communication interface, and the input/output interface.

Additionally, the device account server 108 may refer to a server apparatus. Even though the device account server 108 may be the semantically or functionally same device as a server apparatus, both may be used distinctively in expression as necessary.

FIG. 5A is a block diagram illustrating elements of a processor 120 according to an embodiment of the present invention. According to an embodiment, the processor 120 may include an authentication approval unit 121, an identification information provider 123, and a device account manager 125, all of which may be formed of a single integrated module but, in this embodiment, may be formed as separate components.

According to an embodiment, the authentication approval unit 121 may control the display 160 to display an authentication request message received from the device account server 108. Simultaneously or sequentially, the authentication approval unit 121 may store the received authentication request message in the memory 130. If an input signal for authentication approval is received from a user, the authentication approval unit 121 may transmit authentication approval information to the device account server 108.

According to another embodiment, the authentication approval unit 121 may perform an authentication approval operation by using authentication information created automatically on the basis of conditions predetermined in the electronic device 101. For example, the authentication approval unit 121 may create automatically authentication approval information under predetermined conditions such as a specific external device 107, a specific time, and/or a specific location. The authentication approval unit 121 may receive such predetermined conditions from a user and store the received conditions in the memory 130.

According to an embodiment, the identification information provider 123 may offer identification information to the external device 107. For example, the identification information provider 123 may recognize a distance between the electronic device 101 and the external device 107. If the recognized distance is equal to or smaller than a predetermined distance, the identification information provider 123 may retrieve identification information from the memory 130 and then transmit it to the external device 107. The identification information provider 123 may receive proximity information between the electronic device and the external device 107 from the communication interface 170 or the sensor module 240. Then the identification information provider 123 may compare the received proximity information with a predetermined distance. This predetermined distance may be, for example, the minimum or maximum distance value in specification which allows the communication interface 170 can transmit data to the external device 107. Also, a predetermined distance may be an arbitrary value which can be set by a user. If a distance between the electronic device 101 and the external device 107 is equal to or smaller than a predetermined distance, the identification information provider 123 may transmit identification information to the external device 107 through the communication interface 170. Therefore, the external device 107 may not receive a user's input for authentication. The external device 107 may recognize, as information for an authentication approval request, identification information received from the electronic device 101.

According to an embodiment, the device account manager 125 may manage at least one external device 107 authenticated successfully and an authentication status (e.g., authentication access/release) of at least one service offered through the external device 107 or the electronic device 101. For this, the device account manager 125 may receive information about a device profile manager 108b from the device account server 108. For example, the device account manager 125 may receive device profile manager information from the device account server 108 through the communication interface 170.

According to an embodiment, the device account manager 125 may control the display 160 to display partially or wholly such device profile manager information received from the device account server 108. Also, the device account manager 125 may transmit, to the device account server 108, control information for controlling authentication access/release of at least one service offered through the external device 107 or the electronic device 101. According to an embodiment, the device account manager 125 may create a control information signal by receiving a control input from a user through the input/output interface 150. Then the device account manager 125 may transmit the created control information signal to the device account server 108.

According to another embodiment, the device account manager 125 may receive proximity information between the electronic device 101 and the external device 107 through the communication interface 170 or the sensor module 240. Also, based on the received proximity information, the device account manager 125 may create a control signal for controlling authentication access/release of the external device 107. For example, if the electronic device 101 is located at a predetermined distance or more from the specific external device 107, the device account manager 125 may create a control signal for releasing access of a service offered through the external device 107 and then transmit the control signal to the external device 107 through the communication interface 170. The external device 107 that receives the control signal may release access of part or all of at least one service offered therethrough.

FIG. 5B is a block diagram illustrating elements of a device account server 108 according to an embodiment of the present invention. According to an embodiment, the device account server 108 may include a device license manager 108a, a device profile manager 108b, and an authentication manager 108c, all of which may be formed of a single integrated module but, in this embodiment, may be formed as separate components.

According to an embodiment, the device license manager 108a may perform a function to issue a device-based account. For example, the device license manager 108a may create or manage an account based on a corresponding device in response to a request of the electronic device 101 or the external device 107.

According to an embodiment, the device profile manager 108b may perform authentication automatically or manually and also record changes in subscription information of a device and in a service status (On/Off). Also, the device profile manager 108b may manage registration information of a device or service. According to various embodiments, the device account server 108 or the device profile manager 108b may contain a DB table. However, this invention is not limited to that, and the device account server 108 may have such a DB table separately from elements shown in FIG. 5B. According to an embodiment, the authentication manager 108c may perform verification of account effectiveness and use registration. In addition, the authentication manager 108c may control the device account server 108 so that a dormant account is withdrawn automatically.

According to an embodiment, the electronic device 101 may include the communication interface 170; the display 150; and the processor 120 configured to receive an authentication request message based on identification information from the device account server 108 through the communication interface 170, configured to, in response to the authentication request message, receive, through the display 150, at least one of an input for authentication approval of a specific device and an input for authentication approval of a service offered through the specific device, and configured to, in response to the input, transmit authentication approval information to the device account server 108 through the communication interface 170.

According to an embodiment, in the electronic device 101, the processor 120 may be further configured to receive, from the device account server 108, information about the specific device and/or information about the service offered through the specific device, and to set an authentication type for the specific device and/or an authentication type for the service offered through the specific device. In this case, an input for the authentication approval may be received based on the set authentication type.

According to an embodiment, in the electronic device 101, the processor 120 may be further configured to receive, from the device account server 108, information about the specific device and/or information about the service offered through the specific device, to receive a control input for restricting use of the service offered through the specific device, based on the information about the specific device and/or the information about the service offered through the specific device, and to transmit, to the device account server 108, a control signal created in response to the control input.

According to an embodiment, the device account server 108 may include the communication interface 170; and the processor 120 configured to receive, from a specific device through the communication interface 170, at least one of authentication request information for the specific device and authentication request information for a service offered through the specific device, configured to create and transmit an authentication request message to the electronic device 101 identified according to identification information contained in the authentication request information, configured to receive, from the electronic device 101 through the communication interface 170, at least one of an input for authentication approval of the specific device and an input for authentication approval of a service offered through the specific device, and configured to transmit authentication token information created in response to the input to the specific device.

According to an embodiment, the device account server 108 may contain at least one of information about the specific device and information about a service offered through the specific device. Additionally, the processor 120 may be further configured to transmit, to the electronic device 101, at least one of the information about the specific device and the information about a service offered through the specific device, to receive, from the electronic device 101, a control signal for restricting use of the service offered through the specific device, and to transmit the control signal to the specific device.

FIG. 6A is a flow diagram illustrating an authentication method for a device and/or a service according to an embodiment of the present invention.

According to an embodiment, at operation 610, the electronic device 101 may register identification information in the device account server 108. For example, the electronic device 101 may transmit user authentication request information therefor to the device account server 108. This authentication request information may include user identification information of the electronic device 101 and device information of the electronic device 101. The device account server 108 may store the authentication request information received from the electronic device 101. At this operation, the electronic device 101 may be registered as a device that supports user authentication for the external device 107, a service offered through the external device 107, or a service offered through the electronic device 101.

According to an embodiment, at operation 630, the electronic device 101 may receive an authentication request message based on identification information from the device account server 108.

According to an embodiment, the authentication request message may be a message for requesting user authentication for a device or service, which may be, for example, the external device 107, a service offered through the external device 107, or a service offered through the electronic device 101.

According to an embodiment, the external device 107 may receive an input of a user authentication request therefor or for a service offered therethrough from a user. For example, the external device 107 may receive user identification information of the electronic device 101, as an authentication request input, from a user. Also, the external device 107 may transmit authentication request information therefor or for a service offered therethrough to the device account server 108. The device account server 108 receiving the authentication request information from the external device 107 may search a device profile manager 108b for device information of the electronic device 101 corresponding to user identification information. The user identification information may be contained in the authentication request information transmitted to the device account server 108 by the external device 107. If any device information of the electronic device 101 corresponding to the user identification information is found in the device profile manager 108b, the device account server 108 may transmit an authentication request message to the electronic device 101, based on a phone number, etc. contained in the device information of the electronic device 101. Also, the device account server 108 may transmit the authentication request message to the electronic device 101 by using a push message, and for implementing this, may include an additional push server or the like.

According to another embodiment, the electronic device 101 may receive an input for a user authentication request for a service offered therethrough from a user. Then the electronic device 101 may transmit user authentication request information for a service offered therethrough to the device account server 108. For example, the user authentication request information may include user identification information of the electronic device 101 and device information of the electronic device 101. The device account server 108 receiving the authentication request information from the electronic device 101 may search the device profile manager 108b for device information of the electronic device 101 corresponding to user identification information. If any device information of the electronic device 101 corresponding to the user identification information is found in the device profile manager 108b, the device account server 108 may transmit an authentication request message to the electronic device 101. The authentication method according to this embodiment may not use the external device 107.

According to an embodiment, the electronic device 101 may display, through the display 160, the authentication request message received from the device account server 108. For example, the authentication approval unit 121 may recognize that the authentication request message is received from the device account server 108. Then the authentication approval unit 121 may transmit authentication request message information to the display 160 and control the display 160 to display the authentication request message information thereon.

According to an embodiment, at operation 650, the electronic device 101 may receive an input for a user authentication approval of a device or service from a user. This device or server may be the external device 107, a service offered through the external device 107, or a service offered through the electronic device 101. For example, the authentication approval unit 121 may receive an input signal regarding authentication approval or not of such a device or service from a user through the input/output interface 150 or the display 160.

According to an embodiment, at operation 670, the electronic device 101 may transmit authentication approval information to the device account server 108 so that user authentication for a device or service is completed through the device account server 108. For example, when an input for authentication approval is received from a user, the authentication approval unit 121 may create authentication approval information and then transmit the authentication approval information to the device account server 108 through the communication interface 170.

According to an embodiment, depending on the authentication approval information received from the electronic device 101, the device account server 108 may transmit device authentication token information and/or service authentication token information to the external device 107 or the electronic device 101. Based on such device authentication token information and/or service authentication token information, the external device 107 or the electronic device 101 may finish user authentication for the external device 107, the electronic device 101, a service offered through the external device 107, or a service offered through the electronic device 101. Although not shown, according to another embodiment, in case each of the electronic device 101 and the external device 107 has a phone number (i.e., user identification information), this operation of user authentication may be performed at the external device 107 or at the electronic device 101. For example, in case of trying to further authenticate another service after user authentication for a certain device or for a service offered through the device, it is possible to create user authentication request information by entering user identification information of the external device 107 or user identification information of the electronic device 101. Also, according to another embodiment, the electronic device 101 may offer a user registration menu to a user, and the user may enter a phone number of the external device 107 into the user registration menu. This user registration menu may be a menu capable of using, as user identification information, both a phone number of the electronic device 101 and a phone number of the external device 107. Therefore, a user of the electronic device 101 may use both phone numbers as user identification information required for user authentication. Additionally, each of the external device 107 and the electronic device 101 may be a means for entering user authentication approval information.

FIGS. 6B to 6D are exemplary diagrams illustrating operations shown in FIG. 6A.

FIG. 6B illustrates operation of requesting user authentication for an account service 601 offered through the external device 107 (e.g., PC). A user may enter user identification information "010-2716-XXXX" into a user identification information input window 602 of the external device 107. After that, a user may click a login button 603, and then the external device 107 may create user authentication request information for the account service 601 in response to the click on the login button 603. The user authentication request information may include information about the account service 601 offered through the external device 107 and user identification information. Although not shown, the external device 107 may transmit created authentication request information to the device account server 108. Then the device account server 108 may search the device profile manager 108b for the electronic device 101 mapped to user identification information. Also, the device account server 108 may transmit a user authentication request message for the account service 601 to the electronic device 101 found in the device profile manager 108b.

FIG. 6C illustrates operation of, at the electronic device 101, displaying an authentication request message 604 received from the device account server 108. The authentication request message 604 may contain device information of the external device 107, service information, and a query about authentication approval. The authentication request message 604 may be formed with a various-sized UI screen. If a user selects (e.g., touches or clicks) an OK button 605 in the authentication request message 604, the electronic device 101 may recognize this selection as an input for authentication approval. Then the electronic device 101 may create authentication approval information for the account service and transmit the created authentication approval information to the device account server 108. On the other hand, if a user selects a cancel button 606 in the authentication request message 604, the electronic device 101 may recognize this selection as an input for denying authentication approval. Then the electronic device 101 may take no action in response to this input.

FIG. 6D illustrates operation of requesting user authentication for a kids account creation service 607 and a content purchase service 608. The kids account creation service 607 and the content purchase service 608 may be different from each other. In this operation, a user of the external device 107 (e.g., PC) may be a kid. The user may enter user identification information "010-1234-XXXX" into a user identification information input window 607a or 607b of the external device 107. At this time, the user identification information may be identification information about a user's parent. After entering the user identification information, the user of the external device 107 may select (e.g., touch or click) a login button 607b, and then the external device 107 may create user authentication request information for the kids account creation service 607. Similarly, the user who enters the user identification information may select a content purchase button 608b, and then the external device 107 may create user authentication request information for the content purchase service 608. The external device 107 may transmit the created user authentication request information to the device account server 108, and then the device account server 108 may transmit an authentication request message to a user (or a user's parent) of the electronic device 101 mapped to the user identification information. When the user (or the user's parent) of the electronic device 101 approves authentication, user authentication for each service may be finished.

FIG. 7A is a flow diagram illustrating operations of, at an electronic device, offering user identification information to an external device according to an embodiment of the present invention. FIGS. 7B and 7C are exemplary diagrams illustrating operations shown in FIG. 7A. In the following description with reference to FIGS. 7A to 7C, some operations similar to those of FIGS. 6A to 6D may be omitted.

According to an embodiment, at operation 710, the electronic device 101 may check whether a distance between the electronic device 101 and the external device 107 is equal to or smaller than a predetermined distance. For this, the identification information provider 123 may measure, in real time or periodically, a distance between the electronic device 101 and the external device 107 by using the communication interface 170 or the sensor module 240. Then the identification information provider 123 may determine whether the measured distance is equal to or smaller than a predetermined distance. For this, the identification information provider 123 may receive a value of the predetermined distance from the memory 130. The predetermined distance value may be, for example, certain proximity information which is set by a user or registered by a designer of the electronic device 101. According to another embodiment, the predetermined distance value may be the minimum or maximum functional distance which allows the Bluetooth module, the NFC module, etc. of the communication interface 170 can transmit or receive data.

According to another embodiment, if a distance between the electronic device 101 and the external device 107 is equal to or smaller than a predetermined distance, the electronic device 101 may offer identification information thereof to the external device 107 at operation 720. For example, when a distance between the electronic device 101 and the external device 107 is equal to or smaller than a predetermined distance, the identification information provider 123 may transmit identification information to the external device 107. Referring to FIG. 7B, for example, the external device 107 is requesting an input of identification information (e.g., user identification information of the electronic device 101) for user authentication for a service (or account) offered therethrough. If a distance between the electronic device 101 and the external device 107 is equal to or smaller than a predetermined distance, the external device 107 may receive user identification information from the electronic device 101 and display the received information in a user identification information input window 701. The user identification information may be, for example, a phone number (e.g., 010-2716-XXXX) of a user of the electronic device 101. A user may check the phone number displayed in the user identification information input window 701 and select a login button 702. Then the external device 107 may recognize this selection of the login button 702 as a login input.

According to another embodiment, from the electronic device 101, the external device 107 may receive an input of the user identification information in the window 701 and further receive a login input for the button 702.

According to still another embodiment for offering user identification information, as shown in FIG. 7C, the external device 107 is requesting an input of identification information (e.g., user identification information of the electronic device 101) for user authentication for a service offered therethrough. Contrary to FIG. 7B, the external device 107 requests a selection of user accounts 703 and 704 authenticated in a service thereof. These user accounts 703 and 704 which have been authenticated through the electronic device 101 may be stored in the memory of the external device 107. Although not shown, the user accounts 703 and 704 may appear in the form of a popup window when a specific event such as a double click occurs on the user identification information input window 701 in FIG. 7B. If a distance between the electronic device 101 and the external device 107 is equal to or smaller than a predetermined distance, the electronic device 101 may transmit control information to the external device 107 so that the user account 703 for a user of the electronic device 101 may be distinctively displayed on the external device 107. Also, the external device 107 may recognize the electronic device 101 and thereby recognize specific identification information stored therein. For example, if a distance between the electronic device 101 and the external device 107 is equal to or smaller than a predetermined distance, the external device 107 may recognize the electronic device 101 and retrieve the user account 703 mapped to the electronic device 101 from the memory thereof. If the user account 703 mapped to the electronic device 101 is found in the memory, the external device 107 may distinctively display the user account 703 based on user identification information of the electronic device 101. When the user account 703 is selected, a user may select (e.g., touch or click) a login button 705. Alternatively, when the user account 703 of the electronic device 101 is found, the external device 107 may automatically transmit authentication request information having the user account 703 to the device account server 108.

Returning to FIG. 7A, according to an embodiment, if a distance between the electronic device 101 and the external device 107 exceeds a predetermined distance, the external device 107 may not receive identification information from the electronic device 101 at operation 730. Instead, the external device 107 may receive an input of identification information directly from a user.

According to an embodiment, at operation 740, the electronic device 101 may receive an authentication request message from the device account server 108, based on identification information.

According to an embodiment, at operation 750, the electronic device 101 may receive an input signal for service authentication approval of the external device 107.

According to an embodiment, at operation 760, the electronic device 101 may transmit authentication approval information to the device account server 108 so that user authentication for a service offered at the external device 107 is completed through the device account server 108. The device account server 108 may create authentication token information, based on authentication approval information, and transmit it to the external device 107. Therefore, service authentication may be finished at the external device 107.

FIG. 7D is an exemplary diagram illustrating operations of, at an electronic device 101 and a device account server 108, performing authentication for additional electronic devices according to various embodiments of the present invention.

As shown in FIG. 7D, the electronic device 101 may offer identification information (e.g., an access key, etc.) for recognizing the electronic device 101 or a user thereof to at least one of additional electronic devices 719, 721, 723 and 725. Then the at least one of additional electronic devices 719, 721, 723 and 725 may deliver, without any input, the received identification information to a server (e.g., the device account server 108) having authentication information of the electronic device 101. This server may determine whether the identification information correspond to the electronic device 101 or a user of the electronic device 101, and then, based on such information, request the electronic device 101 to authenticate the at least one of additional electronic devices 719, 721, 723 and 725. If this authentication request is approved by the electronic device 101, authentication for the at least one additional electronic devices 719, 721, 723 and 725 may be completed. In this case, if the electronic device 101 is a parent terminal, at least one of the additional electronic devices 719, 721, 723 and 725 may be authenticated as a child terminal of the parent terminal or of a user of the parent terminal.

Now, focusing on FIG. 7D, the entire authentication method is described. At operation 707, the electronic device 101 may perform, together with the device account server 108, initial authentication associated with the electronic device 101 or a user of the electronic device 101. For example, the electronic device 101 may register identification information thereof or user identification information thereof in the device account server 108. Thereafter, according to various embodiments discussed hereinbefore, the electronic device 101, the external device 107 and the device account server 108 may perform authentication for the external device 107 at operations 709, 711 and 713.

Additionally, the electronic device 101 and the device account server 108 may perform authentication for at least one of the additional electronic devices 719, 721, 723 and 725. Specifically, at operation 715, the electronic device 101 may deliver identification information to a certain additional electronic device that needs authentication or login. This identification information may be information for identifying the electronic device 101 or a user of the electronic device 101. For example, this identification information may include identification information of the electronic device 101, user identification information of the electronic device 101, and/or an access key which can be created dynamically. If the electronic device 101 offers such identification information to the external device 107 or the additional electronic device through short range communication or a user's input, the additional electronic device may transmit an authentication/login request including identification information to the device account server 108 at operation 717. Then the device account server 108 may identify the electronic device 101 mapped to the received identification information and also, at operation 711, request the identified electronic device 101 to authenticate the additional electronic device. The electronic device 101 may approve authentication for the additional electronic device in response to a request received from the device account server 108 and also, at operation 713, transmit authentication approval information to the device account server 108.

FIG. 8A is a flow diagram illustrating operations of, at an electronic device 101, offering an access release control signal to an external device 107 according to an embodiment of the present invention. FIG. 8B is an exemplary diagram illustrating operations shown in FIG. 8A. In the following description with reference to FIGS. 8A and 8B, some operations similar to those of FIGS. 6A to 6D may be omitted.

According to an embodiment, at operation 810, the electronic device may receive an authentication request message from the device account server 108, based on identification information.

According to an embodiment, at operation 830, the electronic device 101 may receive an input signal for user authentication approval of a service offered through the external device 107 based on authentication request information.

According to an embodiment, at operation 850, the electronic device 101 may transmit authentication approval information to the device account server 108 so that user authentication for a service offered at the external device 107 is completed through the device account server 108. Therefore, user authentication for a service may be finished at the external device 107.

According to an embodiment, at operation 870, the electronic device 101 may determine whether a distance between the electronic device 101 and the external device 107 exceeds a predetermined distance. For this, the device account manager 125 may measure, in real time or periodically, a distance between the electronic device 101 and the external device 107 by using the communication interface 170 or the sensor module 240. Then the device account manager 125 may determine whether the measured distance exceeds a predetermined distance. For this, the device account manager 125 may retrieve a stored predetermined distance from the memory 130. The predetermined distance value may be, for example, certain proximity information which is set by a user or registered by a designer of the electronic device 101. According to another embodiment, the predetermined distance value may be the minimum or maximum functional distance which allows the Bluetooth module, the NFC module, etc. of the communication interface 170 can transmit or receive data.

According to an embodiment, if the measured distance exceeds a predetermined distance, the electronic device 101 may transmit, at operation 890, a control signal to the external device 107 so as to release access of a service offered through the external device 107. For example, the electronic device 101 may transmit a control signal to the external device 107 so that an account based on user identification information of the electronic device 101 may be logged out in a service offered through the external device 107. Also, the external device 107 may recognize a distance from the electronic device 101 and, if this distance exceeds a predetermined distance, may log out a specific account authenticated through the electronic device 101. This predetermined distance may be stored in the external device 107 or received from the electronic device 101.

For example, as shown in FIG. 8B, a smart TV which is the external device 107 may display a plurality of user accounts 801, 802 and 803 each of which completes user authentication for a service. The external device 107 may display a user account 801, authenticated through the electronic device 101, so as to be distinct from the other user accounts 802 and 803. For example, an account which is accessing a current service is the USER A 801. If a plurality of user accounts 801, 802 and 803 are accounts authenticated using user identification information of the same electronic device 101, the currently accessed user account 801 may be an account which completes the latest authentication.

According to an embodiment, if a distance between the external device 107 and the electronic device 101 exceeds a predetermined distance, the electronic device 101 may transmit, to the external device 107, a control signal for instructing logout of the USER A 801 account in a corresponding service. Also, the external device 107 may recognize a distance from the electronic device 101 and, if this distance exceeds a predetermined distance, may log out the user account 801 authenticated through the electronic device 101 (or authenticated most recently).

FIG. 9 is a block diagram illustrating a device profile manager 108b of a device account server 108 according to an embodiment of the present invention.

According to an embodiment, the device profile manager 108b may include a device profile manager by devices 109a and/or a device profile manager by services 109b. The device profile manager by devices 109a contains authenticated services classified according to authenticated devices, and the device profile manager by services 109b contains authenticated devices classified according to authenticated services. The device account server 108 may store information received from the electronic device 101 or the external device 107 in the device profile manager 108b. Although FIG. 9 depicts the device profile manager by devices 109a and the device profile manager by services 109b separately, this is exemplary only. Alternatively, the device account server 108 may classify all types of information according to devices and services in a single device profile manager 108b.

FIG. 10A is a flow diagram illustrating a process of, at a device account server, performing authentication for a service requested by an electronic device according to an embodiment of the present invention. In the following description with reference to FIG. 10A, some operations similar to those of FIG. 6A may be omitted.

According to an embodiment, at operation 1010, the device account server 108 may receive authentication request information for a service offered through the electronic device 101. The device account server 108 may receive, as a precondition to user authentication operation for a device or service, initial authentication request information from the electronic device 101. For example, the device account server 108 may receive, from the electronic device 101, user identification information of the electronic device 101, device information of the electronic device 101, and/or service information offered through the electronic device 101.

According to an embodiment, at operation 1030, the device account server 108 may store, in the device profile manager 108b, service information of the electronic device 101 mapped to device information of the electronic device 101, based on user identification information of the electronic device 101.

According to an embodiment, at operation 1050, the device account server 108 may create authentication token information for the electronic device 101 and for a service offered at the electronic device 101, and also transmit the created authentication token information to the electronic device 101. Then the electronic device 101 may store the authentication token information received from the device account server 108 in the memory 130.

FIG. 10B is an exemplary diagram illustrating a process of updating a device profile manager 108b of a device account server 108 according to operations shown in FIG. 10A. Although FIG. 10B illustrates an update process of the device profile manager by devices 109a, this is exemplary only. The same update process may be applied to the device profile manager by services 109b.

According to an embodiment, the device account server 108 may store authentication request information, received from the electronic device 101, in the device profile manager 108b. The authentication request information may include at least one of user identification information 1001, device information 1002 of the electronic device 101, and service information 1003 offered through the electronic device 101. For example, the device account server 108 may store, in the device profile manager by devices 109a, at least one of the user identification information 1001, the device information 1002 of the electronic device 101, and the service information 1003 offered through the electronic device 101. The device information 1002 may contain a UI item (e.g., representing a mobile phone) and model name (e.g., SHW-M250S). The service information 1003 may contain a message service (e.g., "Chat On").

FIG. 11A is a flow diagram illustrating a process of, at a device account server, performing user authentication for a device or a service according to an embodiment of the present invention. In the following description with reference to FIG. 11A, some operations similar to those of FIG. 6A may be omitted.

According to an embodiment, at operation 1110, the device account server 108 may receive user authentication request information for a service offered at a specific device. For example, the device account server 108 may receive user authentication information from a service offered through the electronic device 101 and/or a service offered through the external device 107.

According to an embodiment, at operation 1120, the device account server 108 may determine whether a device for offering a service is registered in the device account server 108. For example, authentication request information may contain information about whether a device that requests user authentication for a specific service has or not device authentication token information. If a device has device authentication token information, the device account server 108 may transmit, at operation 1180, service authentication token information to a device that offers a corresponding service. Therefore, a user may simply finish user authentication for the service without a need to pass through an additional authentication process.

According to various embodiments, even though it is determined at operation 1120 that a device is registered in the device account server 108, the device account server 108 may perform operation 1180 or 1150 depending on additional conditions (e.g., a predetermined condition). For example, such a predetermined condition may depend on a service policy or a user's selection. For example, depending on a service policy or a user's selection, the device account server 108 may transmit authentication token information automatically or after authentication approval through the electronic device 101. Therefore, even though a certain device is a device registered in the device account server 108, the device account server 108 may offer the authentication token information to the device or service automatically or by means of authentication through the electronic device 101, depending on whether additional conditions are satisfied, or. If a certain device is a device registered in the device account server 108, and if a predetermined condition is satisfied, the device account server 108 may perform operation 1180. If a certain device is a device registered in the device account server 108, and if a predetermined condition is not satisfied, the device account server 108 may transmit, at operation 1150, an authentication request message for the device to the electronic device 101.

According another embodiment, if a certain device is not a device registered in the device account server 108, the device account server 108 may further determine, at operation 1130, whether to register the device in the device account server 108. For example, the device account server 108 may display authentication-requested service information and device information of a device for offering the service. Also, a user may identify the displayed device information and determine whether to register the device in the device account server 108. For example, if a device is a public PC or the like, a user may not register such a device in the device account server 108.

According to an embodiment, if a user's input for not registering a certain device in the device account server 108 is received, the device account server 108 may transmit an authentication request message to the electronic device 101 at operation 1150. In this case, the authentication request message may be a message that requests user authentication for a service at a corresponding device. Although not shown, if user authentication for a certain service is completed, the device account server 108 may transmit service authentication token information only to a corresponding device.

According to another embodiment, if a user's input for registering a certain device in the device account server 108 is received, the device account server 108 may transmit device authentication token information to the device at operation 1140.

According to an embodiment, at operation 1160, the device account server 108 may determine whether a certain service is registered in the device account server 108. For example, authentication request information may contain information about whether a device that requests user authentication has or not service authentication token information about a corresponding service. If the device has service authentication token information about the service, the device account server 108 may transmit, at operation 1180, service authentication token information to a device that offers the service. Therefore, a user may simply finish user authentication for the service without a need to pass through an additional authentication process.

According to various embodiments, even though it is determined at operation 1160 that a service is registered in the device account server 108, the device account server 108 may perform operation 1180 or 1170 depending on additional conditions (e.g., a predetermined condition). For example, if a re-login request is transmitted to the device account server 108 on the basis of identification information after logout of a specific service at the external device, the device account server 108 may transmit authentication token information automatically or after authentication approval through the electronic device 101, based on a predetermined condition such as a service policy or a user's selection (e.g., whether login information such as ID and password is registered at initial login, etc.). Therefore, even though a certain service is a service registered in the device account server 108, the device account server 108 may offer the authentication token information for the service to a corresponding device automatically or by means of authentication through the electronic device 101, depending on whether additional conditions are satisfied. If a certain service is a service registered in the device account server 108, and if a predetermined condition is satisfied, the device account server 108 may perform operation 1180. If a certain service is a service registered in the device account server 108, and if a predetermined condition is not satisfied, the device account server 108 may transmit, at operation 1170, an authentication request message for the service to the electronic device 101.

According to another embodiment, if a certain device fails to have service authentication token information about a corresponding service, the device account server 108 may transmit an authentication request message for user authentication of the service to the electronic device 101 at operation 1170. Although not shown, when user authentication for the service is completed, the device account server 108 may transmit service authentication token information only to the device.

According to an embodiment, at operation 1190, the device account server 108 may update information stored in the device profile manager 108*b*.

FIGS. 11B to 11E are exemplary diagrams illustrating a process of updating a device profile manager 108*b* of a device account server according to operations shown in FIG. 11A.

According to an embodiment, FIG. 11B illustrates the device profile manager by devices 109*a* updated when user authentication for other service is completed at the authenticated electronic device 101 in FIG. 10B. As shown, device information 1103 and service information 1107 and 1109 may be stored in the device profile manager by devices 109*a*, based on user identification information 1101 of the electronic device 101. All kinds of service information 1107 and 1109 may be classified according to the device information 1103.

For example, the device account server 108 may add new service information 1109 to the device profile manager by devices 109*a* when user authentication for another service is completed at the same device. The added service information 1109 may be a so-called S Health service used for managing user's health data.

According to an embodiment, FIG. 11C illustrates the device profile manager by devices 109*a* updated when user authentication for a service 1109 is completed at the external device 1105 (e.g., PC). The service 1109 offered through the external device 1105 may be a service of the same S Health as the service 1109 offered through the electronic device 101. For example, a user of the electronic device 101 may desire that the S Health service for which user authentication has been completed at the electronic device 101 would be authenticated and used at another device. Therefore, when user authentication for the S Health service is finished at the external device 1105, the device account server 108 may add the external device 1005 and a corresponding service 1109 as shown in FIG. 11C.

According to an embodiment, FIG. 11D illustrates the device profile manager by devices 109*a* updated when user authentication for another service 1111 is completed at the external device 1105 (e.g., PC). This service 1111 offered through the external device 1105 may be different from the previously stored services 1107 and 1109. For example, this service 1111 may be the Drop Box service that offers a web file sharing and interworking service. When user authentication for another service 1111 offered through the external device 1105 is finished, the device account server 108 may add this service 1111 into the device profile manager by devices 109*a* by mapping the service 1111 to the external device 1105.

According to an embodiment, FIG. 11E illustrates the device profile manager by services 109*b* of the device account server 108. The device profile manager by services 109*b* may be implemented in another storage space different from that of the device profile manager by devices 109*a*. This is, however, exemplary only. Alternatively, the device account server 108 may retrieve information stored in the device profile manager by devices 109*a* and then create or reclassify the device profile manager by services 109*b*. As shown, the device account server 108 may classify the devices 1103 and 1105 according to services 1107, 1109 and 1111, based on the user identification information 1101.

The above-discussed embodiments of the device profile manager 108*b* are exemplary only and not to be considered as a limitation. In another embodiment, the device account server 108 may merely store the device profile manager 108*b* without classification by device or service. For example, as shown in FIG. 13B to be discussed later, the device account server 108 may implement the device profile manager 108*b* in the form of displaying all of authenticated devices and services.

FIG. 12A is a flow diagram illustrating a process of, at an electronic device 101, controlling a device or a service through a device account server 108 according to an embodiment of the present invention.

According to an embodiment, at operation 1210, the electronic device 101 may receive information about the device profile manager 108*b* from the device account server 108. For example, in response to a user's request, the device account manager 125 may request the device account server 108 to offer information having at least one device or at least one service stored in the device profile manager 108*b*.

According to an embodiment, the device account manager 125 may create a control input screen for a device or service, based on the device profile manager information received from the device account server 108. In this operation, the device account manager 125 may process the device profile manager information received from the device account server 108. For example, it is possible to resort service information classified according to devices or device information classified according to services or to form such information by means of image items. Additionally, the device account manager 125 may create UI items such as a user account access/release control window so as to receive, from a user, a user account access/release signal for a device or service stored in the device profile manager 108*b*. User account access/release may mean that a user's account using a user-authenticated device or service is logged in/out at that device or service.

According to an embodiment, at operation 1230, the electronic device 101 may receive a user account access/release control input for an authenticated device or service from a user. The authenticated device or service may a device or service stored in the device profile manager 108*b*. The device account manager 125 may receive a user account access/release control input for the authenticated device or service from a user through the display 160 and then create a user account access/release control signal.

According to an embodiment, at operation 1250, the electronic device 101 may transmit a control signal to the device account server 108. This control signal may include a user account access/release control signal created by the device account manager 125. Based on the control signal received from the electronic device 101, the device account server 108 may transmit the user account access/release control signal to a corresponding device stored in the device profile manager 108*b*. The device which receives the user account access/release control signal from the device account server 108 may log out a user account which is in an access state to a certain service. Also, the device which receives the user account access/release control signal from the device account server 108 may log in again a user account which is logged out from the service. Therefore, a user can stop offering a service to a desired device among a plurality of devices sharing the same service with each other.

According to various embodiments, a user may be offered the same message service (e.g., Chat-On, etc.) at both a mobile phone (i.e., the electronic device 101) and a PC (i.e., the external device 107). Information about the mobile phone, PC and message service may be stored for each user in the device profile manager 108*b* of the device account server 108. A user may desire to use the message service at only the mobile phone. In this case, the user may request, through a control screen of the mobile phone, the device account server 108 to stop offering the message service at the PC. In response to a user's request, the device account server 108 may transmit a user account logout signal of the message service to the PC. Therefore, the user can use the message service at only the mobile phone.

FIGS. 12B and 12C are exemplary diagrams illustrating operations shown in FIG. 12A.

According to an embodiment, as shown in FIG. 12B, the electronic device 101 may display a device/service control window 1200 having device profile manager information through the display 160. The device/service control window 1200 may contain a user identification information window

1201, device information 1203 or 1205, a more view icon 1208 or 1211, and a device access control item 1207 or 1209. For example, the device access control item 1207 associated with the first device (e.g., SMART PHONE 1) indicates the "ON" state. This means that user account access to services offered through the first device (e.g., SMART PHONE 1) is maintained. Also, the device access control item 1209 associated with the second device (e.g., PC 1) indicates the "OFF" state. This means that user account access to services offered through the second device (e.g., PC 1) is released. The electronic device 101 may receive an input event for the device access control item 1207 or 1209 from a user and then transmit a control signal created in response to the input event to the device account server 108. Therefore, with regard to each individual device, a user of the electronic device 101 may control user access/release for services of the device stored in the device profile manager 180*b*.

According to an embodiment, as shown in FIG. 12C, when the more view icon 1208 shown in FIG. 12B is selected by a user, the electronic device 101 may display a user access status of each service 1215 or 1217 in the first device (e.g., SMART PHONE 1). Further, the electronic device 101 may display an information window 1213 for indicating that the displayed services 1215 and 1217 belong to the first device (e.g., SMART PHONE 1). Also, the electronic device 101 may display a cancel window 1223 and, when an input event for selecting the cancel window 1223 is received from a user, may return to a screen shown in FIG. 12B. The electronic device 101 may display service access control items 1219 and 1221 each of which indicates a user access status of each of the services 1215 and 1217 in the first device (e.g., SMART PHONE 1). For example, the service access control item 1219 associated with the first service 1215 (e.g., ChatON) indicates the "ON" state. This means that user account access to the first service 1215 (e.g., ChatON) is maintained. Also, the service access control item 1221 associated with the second service 1217 (e.g., S Health) indicates the "OFF" state. This means that user account access to the second service 1221 (e.g., S Health) is released. The electronic device 101 may receive an input event for the service access control item 1219 or 1221 from a user and transmit a control signal created in response to the input event to the device account server 108. Therefore, with regard to each individual service, a user of the electronic device 101 may control user access/release for services of the device stored in the device profile manager 180*b*.

FIG. 12D is an exemplary diagram illustrating operations of, at an electronic device 101, controlling login/logout of a device or a service on the basis of proximity information with an external device according to an embodiment of the present invention.

According to an embodiment, at operation 1270, the authentication of a device or service may be finished in various embodiments discussed hereinbefore. For example, the authentication of the external device 107 or of a service offered through the external device 107 may be finished through the electronic device 101 and the device account server 108.

According to an embodiment, at operation 1290, the electronic device 101 or the device account server 108 may control login/logout of a device or service, based on proximity information between the electronic device 101 and the external device 107. For example, if authentication token information about the authenticated external device 107 or a service offered through the external device 107 is deleted or the available period thereof has expired, the electronic device 101 or the device account server 108 may support the authentication of the external device 107 or a service offered through the external device 107, based on proximity information with the external device 107. According to various embodiments, if a distance between the electronic device 101 and the external device 107 is equal to or smaller than a predetermined distance (namely, in case of proximity), the electronic device 101 or the device account server 108 may control the external device 107 or transmit a control signal to the external device 107 so that an automatic login is possible without any authentication process. Similarly, if a distance between the electronic device 101 and the external device 107 exceeds a predetermined distance, the electronic device 101 or the device account server 108 may control the external device 107 or transmit a control signal to the external device 107 so that an automatic logout is possible without any authentication process.

According to various embodiments, the external device 107 or a service offered through the external device 107 may be authenticated again (e.g., re-login) only after authentication approval through the electronic device 101 regardless of proximity information with the electronic device 101. For example, depending on attributes of the external device 107 or a service offered through the external device 107, it may be determined whether to perform authentication approval of the electronic device 101.

Meanwhile, as discussed earlier in FIG. 6C, the electronic device 101 may display, in the form of a popup UI having an OK button and a cancel button, the authentication request message 604 received from the device account server 108. The authentication request message 604 may include device information of the external device 107, service information, and a query about authentication approval. According to various embodiments, a display form of the authentication request message 604 is not limited to the above example. If security is required or if there is a user's demand, various authentication types may be further set.

FIG. 13A is a flow diagram illustrating a method of, at an electronic device 101, setting an authentication type for a device or a service according to an embodiment of the present invention. FIGS. 13B and 13C are exemplary diagrams illustrating operations shown in FIG. 13A. In the following description with reference to FIG. 13A, some operations similar to those of FIG. 6A may be omitted.

According to an embodiment, at operation 1310, the electronic device 101 may receive device profile manager information from the device account server 108. For example, in response to a user's request, the device account manager 125 may request the device account server 108 to offer information about at least one device and/or at least one service stored in the device profile manager 108*b*.

According to an embodiment, the device account manager 125 may create a control screen for selecting of an authentication type in the electronic device 101, based on information of the device profile manager 108*b*. In this process, the device account manager 125 may process information of the device profile manager 108*b* received from the device account server 108. For example, it is possible to resort service information classified according to devices or device information classified according to services or to form such information by means of image items. Additionally, in order to allow a change in authentication type of the electronic device 101 for a device or service, the device account manager 125 may create a UI menu item or window for changing an authentication type.

For example, as shown in FIG. 13B, the electronic device may display registered device information 1301 and registered service information 1302 both of which have the form of a UI panel. The registered device information 1301 and the registered service information 1302 may be information stored in the device profile manager 108b of the device account server 108. For example, the registered device information 1301 may contain a wearable device 1301a, a smart printer 1301b, and a smart TV 1301c. For example, the registered service information 1302 may contain FACEBOOK™ 1302a, NAVER™ 1302b, and DAUM™ 1302c. The illustrated classification form of the device information 1301 and the service information 1302 may be implemented at the device account server 108. Alternatively or additionally, the electronic device 101 may receive information of the device profile manager 108b from the device account server 108 and classify the received information as shown in FIG. 13B.

Meanwhile, according to various embodiments of this disclosure, a plurality of authentication types shown in FIG. 13C may be predetermined by a user.

The electronic device 101 may receive in advance a user's input for selecting an authentication type needed to perform authentication for a device or service. For example, when any external device is registered in the electronic device 101 or in the device account server 108, an authentication type corresponding to the external device may be predetermined. Alternatively, when there is an authentication request from the device account server 108, at least one of authentication types registered in the electronic device 101 may be used in authentication for a corresponding external device.

For example, when a user selects the smart printer 1301b as shown in FIG. 13B, the electronic device 101 may display a control window 1303 for setting an authentication type of the smart printer 1301b as shown in FIG. 13C. In this case, displayed in the control window 1303 may be a list of authentication types registered in advance from a user. When a user selects one of authentication types displayed in the control window 1303 and enters preregistered authentication information, authentication approval is finished. For example, if a user selects a fingerprint type in the control window 1303, the electronic device 101 may further offer a suitable UI for receiving a user's fingerprint input and then determine whether the received fingerprint is matched to preregistered fingerprint. In case of matched fingerprint, the electronic device 101 may create authentication approval information for the printer 1301b or for a service offered through the printer 1301b.

According to an embodiment, at operation 1330, the electronic device 101 may set an authentication type corresponding to a device and/or a service. In this operation, the authentication type may be received from a user so as to create authentication approval information when an authentication request message is received from the device account server 108. The electronic device 101 may receive a user's input for selecting an authentication type.

Operation of receiving an input for selecting an authentication type may be performed in case an external device for authentication is a device requiring a security procedure in an access process or the like. Also, depending on types of external devices, a user may select whether to set an authentication type.

For example, when a user selects the smart printer 1301b as shown in FIG. 13B, the electronic device 101 may display a control window 1303 for setting an authentication type of the smart printer 1301b as shown in FIG. 13C. If a user selects a cancel button 1305, the electronic device 101 may display again a screen of FIG. 13C. If a user selects a password type as the authentication type of the smart printer 601b through an authentication type window 1304 and then selects an OK button 1306, the electronic device 101 may store the selected authentication type in the memory 130. Thereafter, when a user authentication request message for a service of the printer 1301b is received from the device account server 108, the electronic device 101 may create authentication approval information for the printer 1301b or a service offered through the printer 1301b in response to only a password input.

According to an embodiment, operations associated with setting, changing and deleting an authentication type may be performed at the electronic device 101 and, according to user's setting, may be also performed at the external device or the device account server 108.

FIG. 14 is a flow diagram illustrating a user authentication process among an electronic device 101, an external device 107, and a device account server 108 according to an embodiment of the present invention.

According to an embodiment, at operation 1405, the electronic device 101 may transmit user identification information of and device information of the electronic device 101 to the device account server 108. For example, the electronic device 101 may send user authentication request information for the electronic device 101 or for a service offered through the electronic device 101 to the device account server 108. This authentication request information may include user identification information and device information.

According to an embodiment, at operation 1410, the device account server 108 may update information in the device profile manager 108b, based on the authentication request information received from the electronic device 101.

According to an embodiment, at operation 1415, the device account server 108 may transmit authentication token information to the electronic device 101. Then the electronic device 101 may the received authentication token information in the memory 130.

According to an embodiment, at operation 1420, the external device 107 may receive an input of identification information from a user. According to another embodiment, the external device 107 may receive identification information from the electronic device 101. Since this operation is described earlier with reference to FIG. 7A, a detailed description is omitted.

According to an embodiment, at operation 1425, the external device 107 may transmit authentication request information to the device account server 108. For example, the external device 107 may send authentication request information for the external device 107 or for a service offered through the external device 107 to the device account server 108.

According to another embodiment, the electronic device 101 may transmit user authentication request information for a service offered through the electronic device 101 to the device account server 108. In this case, a service requesting user authentication may be different from a service at operation 1405.

According to an embodiment, at operation 1430, the device account server 108 may search the device profile manager 108b for the electronic device 101 corresponding to identification information. This identification information may mean user identification information of the electronic device 101 and may be contained in the authentication request information.

According to an embodiment, at operation 1435, the device account server 108 may transmit an authentication request message to the found electronic device 101.

According to an embodiment, at operation 1440, the electronic device 101 may store the received authentication request message in the memory 130.

According to an embodiment, at operation 1445, the electronic device 101 may receive an input for user authentication approval for a corresponding device or service from a user.

According to an embodiment, at operation 1450, the electronic device 101 may transmit authentication approval information to the device account server 108.

According to an embodiment, at operation 1455, the device account server 108 may transmit authentication token information to the external device 107. According to another embodiment, the device account server 108 may send authentication token information to the electronic device 101.

According to an embodiment, at operation 1460, the device account server 108 may update device profile manager, based on information received from the external device 107 or from the electronic device 101.

According to an embodiment, at operation 1465, the external device 107 may finish user authentication for the external device 107 or for a service offered through the external device 107, based on the authentication token information received from the device account server 108.

According to another embodiment, the electronic device 101 may finish user authentication for a service offered through the electronic device 101, based on the authentication token information received from the device account server 108.

According to an embodiment, at operation 1470, the external device 107 may store user identification information of the electronic device 101.

According to an embodiment, at operation 1475, the external device 107 may transmit authentication-related information of the external device 107 to the device account server 108. Therefore, the device account server 108 may store the authentication-related information. Also, at operation 1480, the device account server 108 may transmit the authentication-related information of the external device 107 to the electronic device 101. According to another embodiment, the external device 107 may send the authentication-related information of the external device 107 directly to the electronic device 101.

According to an embodiment, at operation 1485, the electronic device 101 may store the authentication-related information of the external device 107 received from the device account server 108 or from the external device 107.

According to an embodiment, an authentication method may include operations of: at an electronic device 101, receiving an authentication request message based on identification information from a server apparatus (e.g., the device account server 108); at the electronic device 101, in response to the authentication request message, receiving at least one of an input for authentication approval of a specific device and an input for authentication approval of a service offered through the specific device; and at the electronic device 101, in response to the input, transmitting authentication approval information to the server apparatus.

According to an embodiment, in the authentication method, the identification information may include at least one of a phone number of a user of the electronic device 101, an email address of the user, biometric information of the user, and a key created for authentication.

According to an embodiment, the authentication method may further include operation of: when the specific device include an external device 107 and the service includes a service offered through the external device 107, at the electronic device 101, transmitting the identification information to the external device 107, based on proximity information between the external device 107 and the electronic device 101.

According to an embodiment, the authentication method may further include operation of: when the specific device include an external device 107 and the service includes a service offered through the external device 107, at the electronic device 101, controlling a login or logout function of the external device 107 and/or the service offered through the external device 107, based on proximity information between the external device 107 and the electronic device 101.

According to an embodiment, in the authentication method, the operation of controlling the login or logout function may include: if a distance between the external device 107 and the electronic device 101 exceeds a predetermined distance, at the electronic device 101, transmitting a control signal to the external device 107 or to the server apparatus so that at least one of the external device 107 and the service offered through the external device 107 is logged out automatically; or if a distance between the external device 107 and the electronic device 101 is equal to or smaller than a predetermined distance, at the electronic device 101, transmitting a control signal to the external device 107 or to the server apparatus so that at least one of the external device 107 and the service offered through the external device 107 is logged in automatically.

According to an embodiment, the authentication method may further include operations of: at the electronic device 101, receiving, from the server apparatus, information about the specific device and/or information about the service offered through the specific device; and at the electronic device 101, setting an authentication type for the specific device and/or an authentication type for the service offered through the specific device. Herein, an input for the authentication approval may be received based on the set authentication type.

According to an embodiment, the authentication method may further include operations of: at the electronic device 101, receiving, from the server apparatus, information about the specific device and/or information about the service offered through the specific device; at the electronic device 101, receiving a control input for restricting use of the service offered through the specific device, based on the information about the specific device and/or the information about the service offered through the specific device; and at the electronic device 101, creating a control signal in response to the control input and transmitting the created control signal to the server apparatus.

According to an embodiment, the authentication method may further include operations of: when the specific device is the electronic device 101 and the service is a service offered through the electronic device 101, at the electronic device 101, transmitting, to the server apparatus, authentication request information for another service offered through the electronic device 101; and at the electronic device 101, finishing authentication for the another service by receiving authentication token information about the another service from the server apparatus.

According to an embodiment, an authentication method may include operations of: at a server apparatus (e.g., the device account server 108), receiving, from a specific device, at least one of authentication request information for the specific device and authentication request information for a service offered through the specific device; at the server apparatus, identifying an electronic device 101, based on identification information contained in the authentication request information, creating an authentication request message, and transmitting the authentication request message to the electronic device 101; at the server apparatus, receiving, from the electronic device 101, at least one of an input for authentication approval of the specific device and an input for authentication approval of a service offered through the specific device; and at the server apparatus, transmitting authentication token information created in response to the input to the specific device.

According to an embodiment, the authentication method may further include operations of: when the server apparatus contains at least one of information about the specific device and information about a service offered through the specific device, at the server apparatus, transmitting, to the electronic device 101, at least one of the information about the specific device and the information about a service offered through the specific device; and at the server apparatus, receiving, from the electronic device 101, a signal for controlling a login or logout function of at least one service offered through the specific device, and transmitting the received signal to the specific device.

According to an embodiment, the authentication method may further include operations of: when the specific device is the electronic device 101 and the service is a service offered through the electronic device 101, at the server apparatus, receiving, from the electronic device 101, authentication request information for another service offered through the electronic device 101; and at the server apparatus, transmitting, to the electronic device 101, authentication token information for the another service created according to the authentication request information.

According to an embodiment, the authentication method may further include operations of: at the server apparatus, receiving authentication request information for another service, being different from the service, from the specific device; at the server apparatus, based on the authentication request information, determining whether the specific device is registered or not in the server apparatus; and at the server apparatus, if the specific device is registered in the server apparatus, based on a predetermined condition, performing operation of: creating authentication token information for the another service and transmitting the authentication token information to the specific device; or creating an authentication request message for the another service and transmitting the authentication request message to the electronic device 101.

According to an embodiment, the authentication method may further include operations of: if the specific device is not registered in the server apparatus, at the server apparatus, determining whether to register the specific device; and at the server apparatus, in case of registering the specific device, creating authentication token information for the specific device and transmitting the authentication token information to the specific device.

According to an embodiment, the authentication method may further include operation of: at the server apparatus, in case of not registering the specific device in the server apparatus, creating an authentication request message for another service and transmitting the authentication request message to the electronic device 101.

According to an embodiment, the authentication method may further include operations of: at the server apparatus, determining whether the another service is registered or not in the server apparatus; and at the server apparatus, if the another service is registered in the server apparatus, based on a predetermined condition, performing operation of: creating authentication token information for the another service and transmitting the authentication token information to the specific device; or creating an authentication request message for the another service and transmitting the authentication request message to the electronic device 101.

According to an embodiment, an authentication method may include operations of: at an external device 107, receiving an input of identification information; at the external device 107, creating at least one of authentication request information for the external device 107 and authentication request information for a service offered through the external device 107, based on the identification information, and transmitting the created authentication request information to a server apparatus; at the external device 107, receiving authentication token information from the server apparatus; and at the external device 107, finishing at least one of authentication for the external device 107 and authentication for a service offered through the external device 107 according to the authentication token information.

According to an embodiment, an authentication method may include operations of: at an external device 107, receiving an input of identification information, creating at least one of authentication request information for the external device 107 and authentication request information for a service offered through the external device 107, based on the identification information, and transmitting the created authentication request information to a server apparatus (e.g., the device account server 108); at the server apparatus, identifying an electronic device 101, based on the authentication request information, creating an authentication request message, and transmitting the authentication request message to the electronic device 101; at the electronic device 101, in response to the authentication request message, receiving at least one of an input for authentication approval of the external device 107 and an input for authentication approval of a service offered through the external device 107; at the electronic device 101, in response to the input, creating and transmitting authentication approval information to the server apparatus; at the server apparatus, creating authentication token information based on the authentication approval information and transmitting the authentication token information to the external device 107; and at the external device 107, by receiving the authentication token information, finishing at least one of authentication for the external device 107 and authentication for a service offered through the external device 107.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

At least part of the device (e.g., modules or functions thereof) or method (e.g., operations) according to various embodiment may be implemented as commands stored, e.g., in the form of program module, in a computer-readable storage medium. In case commands are executed by a processor (e.g., 120), the processor may perform a particular function corresponding to that commands. The computer-readable storage medium may be, for example, the memory 130.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, e.g., programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or programming module according to this disclosure may include or exclude at least one of the above-discussed elements or further include any other element. The operations performed by the module, programming module or any other element according to this disclosure may be executed sequentially, in parallel, repeatedly, or by a heuristic method. Additionally, some operations may be executed in different orders or omitted, or any other operation may be added.

While this disclosure has been particularly shown and described with reference to an exemplary embodiment thereof, it will be understood by those skilled in the art that various changes in form and details may be made therein without departing from the spirit and scope of this disclosure as defined by the appended claims.

The invention claimed is:

1. A method in an electronic device of authenticating other devices, the method comprising:
requesting registration of user identification information and identification information of the electronic device to a server apparatus;
transmitting, based on a determination that a distance between a specific device and the electronic device is equal to or smaller than a predetermined distance and the specific device is a registered device in the electronic device, the user identification information to the specific device;
receiving an authentication request message for authentication of the specific device from the server apparatus based on a result that the server apparatus searched for the identification information of the electronic device corresponding to the user identification information according to a request of the specific device;
in response to the authentication request message, receiving at least one of:
an input for authentication approval of the specific device, and an input for authentication approval of a service offered through the specific device;
in response to the inputs, transmitting authentication approval information for generating authentication token information related to the specific device to the server apparatus,
wherein the authentication token information is information that the specific device authorizes access of the service based on the server apparatus;
at the electronic device, receiving, from the server apparatus, information about the specific device and/or information about the service offered through the specific device;
at the electronic device, receiving a control input for restricting use of the service offered through the specific device, based on the information about the specific device or the information about the service offered through the specific device; and
at the electronic device, creating a control signal in response to the control input and transmitting the created control signal to the server apparatus.

2. The method of claim 1, wherein the identification information includes at least one of a phone number of a user of the electronic device, an email address of the user, biometric information of the user, and a key created for authentication.

3. The method of claim 1, further comprising:
at the electronic device, setting an authentication type for the specific device or an authentication type for the service offered through the specific device,
wherein the received input for the authentication approval is received based on the set authentication type according to a type of the specific device.

4. An electronic device comprising:
a communication interface;
a display; and
a processor configured to:
request registration of user identification information and identification information of the electronic device to a server apparatus;
transmit, based on a determination that a distance between a specific device and the electronic device is equal to or smaller than a predetermined distance and an external device is a registered device in the electronic device, the user identification information of the electronic device to a the specific device;
receive an authentication request message for authentication of the specific device from the server apparatus through the communication interface based on a result that the server apparatus searched for the identification information of the electronic device corresponding to the user identification information according to a request of the specific device;
in response to the authentication request message, receive, through the display, at least one of:
an input for authentication approval of the specific device, and
an input for authentication approval of a service offered through the specific device;
in response to the inputs, transmit authentication approval information for generating authentication token information related to the specific device to the server apparatus through the communication interface,
wherein the authentication token information is information that the specific device authorizes access of the service based on the server apparatus;
receive, from the server apparatus, information about the specific device and/or information about the service offered through the specific device;
receive a control input for restricting use of the service offered through the specific device, based on the information about the specific device or the information about the service offered through the specific device; and
transmit, to the server apparatus, a control signal created in response to the control input.

5. The electronic device of claim 4, wherein the processor is further configured to set an authentication type for the specific device or an authentication type for the service offered through the specific device, and wherein the received input for the authentication approval is received based on the set authentication type.

6. An authentication method, the method comprising:

at a server apparatus, registering identification information of an electronic device and user identification information according to a request of the electronic device;

at the server apparatus, receiving, from a specific device, at least one of authentication request information for the specific device and authentication request information for a service offered through the specific device based on the user identification information of the electronic device;

at the server apparatus, identifying the electronic device, based on the user identification information determining whether the specific device is registered;

at the server apparatus, searching for the electronic device corresponding to the registered identification information in relation to the user identification information;

at the server apparatus, creating an authentication request message, and transmitting the authentication request message to the electronic device corresponding to the registered identification information;

at the server apparatus, receiving, from the electronic device related to the specific device, at least one of:

an input for authentication approval of the specific device, and an input for authentication approval of a service offered through the specific device;

at the server apparatus, transmitting authentication token information created in response to the received inputs to the specific device, wherein authentication token information is information that the specific device authorizes access of the service based on the server apparatus;

at the server apparatus, transmitting, to the electronic device, at least one of the information about the specific device and the information about the service offered through the specific device; and at the server apparatus, receiving, from the electronic device, a signal for controlling a login or logout function of at least one service offered through the specific device, and transmitting the received signal to the specific device.

* * * * *